(12) United States Patent
Kato et al.

(10) Patent No.: US 9,233,579 B2
(45) Date of Patent: Jan. 12, 2016

(54) TIRE

(75) Inventors: Keiichi Kato, Nakano-ku (JP); Yukihiro Kiwaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 298 days.

(21) Appl. No.: 13/821,927

(22) PCT Filed: Sep. 9, 2011

(86) PCT No.: PCT/JP2011/070638
§ 371 (c)(1),
(2), (4) Date: Mar. 8, 2013

(87) PCT Pub. No.: WO2012/033204
PCT Pub. Date: Mar. 15, 2012

(65) Prior Publication Data
US 2013/0167998 A1 Jul. 4, 2013

(30) Foreign Application Priority Data

| Sep. 9, 2010 | (JP) | 2010-202166 |
| Sep. 9, 2010 | (JP) | 2010-202296 |
| Sep. 9, 2010 | (JP) | 2010-202299 |
| Jun. 3, 2011 | (JP) | 2011-125543 |
| Jun. 3, 2011 | (JP) | 2011-125547 |

(51) Int. Cl.
*B60C 11/117* (2006.01)
*B60C 11/13* (2006.01)
(Continued)

(52) U.S. Cl.
CPC ............. *B60C 11/03* (2013.01); *B60C 11/032* (2013.01); *B60C 11/04* (2013.01); *B60C 11/12* (2013.01);
(Continued)

(58) Field of Classification Search
CPC ............. B60C 11/03; B60C 11/032; B60C 2011/0341; B60C 2011/0355; B60C 2011/0381; B60C 11/125; B60C 11/13; B60C 2011/133; B60C 11/1353; B60C 11/12; B60C 11/124; B60C 2011/1254; B60C 11/04; B60C 11/042; B60C 11/045
USPC .............................. 152/209.1, 209.18, 209.25
See application file for complete search history.

(56) References Cited

U.S. PATENT DOCUMENTS 3,534,798 A 10/1970 Ravenhall
3,727,661 A * 4/1973 Hoke ........................ 152/209.22
(Continued)

FOREIGN PATENT DOCUMENTS

| CN | 1807132 A | 7/2006 |
| CN | 102762391 A | 10/2012 |

(Continued)

OTHER PUBLICATIONS

Chinese Office Action issued in Chinese Application No. 201180053839.6 dated Dec. 23, 2014.
(Continued)

*Primary Examiner* — Eric Hug
(74) *Attorney, Agent, or Firm* — Sughrue Mion, PLLC

(57) ABSTRACT

A pneumatic tire (1010) has a circumferential groove (1020) that extends in the tire circumferential direction (Tc), and a land part (1040) that is adjacent to the circumferential groove (1020) and extends in the tire circumferential direction (Tc). Formed in the circumferential groove (1020) is an inner groove (1110) on the bottom (1020*b*) of the circumferential groove (1020) and recessed more in the tire radial inward direction than the bottom (1020*b*). The inner groove (1110) includes an inclined part (1120) that extends so as to be inclined in the tire circumferential direction (Tc). The land part (1040) has a hook-like groove portion (1210) formed along the direction (A11) in which the inclined part (1120) extends. The extension direction ends (1210*a*, 1210*b*) of the hook-like groove portion (1210) end within the land part.

16 Claims, 27 Drawing Sheets

(51) Int. Cl.
  *B60C 11/04* (2006.01)
  *B60C 11/12* (2006.01)
  *B60C 11/03* (2006.01)

(52) U.S. Cl.
  CPC ............ *B60C 11/13* (2013.01); *B60C 11/1353* (2013.01); *B60C 2011/0381* (2013.01); *B60C 2011/1254* (2013.01); *B60C 2011/133* (2013.01); *B60C 2011/1361* (2013.01)

(56) References Cited

U.S. PATENT DOCUMENTS

| | | | |
|---|---|---|---|
| 2006/0130950 | A1 | 6/2006 | Murata |
| 2007/0051448 | A1 | 3/2007 | Yumii |
| 2009/0301621 | A1 | 12/2009 | Matsushita |
| 2011/0146863 | A1* | 6/2011 | Ochi ........................ 152/209.18 |
| 2011/0277898 | A1 | 11/2011 | Barraud et al. |

FOREIGN PATENT DOCUMENTS

| | | | |
|---|---|---|---|
| FR | 2940185 A1 | | 6/2010 |
| JP | 2000-158916 A | | 6/2000 |
| JP | 2001-030718 | * | 2/2001 |
| JP | 2005-170381 A | | 6/2005 |
| JP | 2006-151029 A | | 6/2006 |
| WO | 2004/103737 A1 | | 12/2004 |
| WO | WO 2010/001785 | * | 1/2010 |

OTHER PUBLICATIONS

International Search Report, PCT/JP2011/070638, Dec. 20, 2011.
Communication dated Jul. 7, 2015 from the European Patent Office in counterpart application No. 11823678.5.
Communication dated Nov. 17, 2015 from the European Patent Office in counterpart European Application No. 11823678.5.

* cited by examiner

TIRE

TECHNICAL FIELD

The present invention relates to a tire in which a circumferential groove extending in the tire circumferential direction is formed, and whose water evacuation performance and tire noise reduction are especially taken into consideration.

BACKGROUND ART

Conventionally, to ensure water evacuation performance on a wet road surface, a method in which multiple circumferential grooves are formed in a tread has been widely used for a pneumatic tire (hereinafter referred to as tire) mounted on a passenger car or the like.

In addition, a tire is known in which, for active evacuation of rainwater entering such circumferential grooves, multiple protrusions inclined relative to the tire circumferential direction are provided on groove bottoms of the circumferential grooves (for example, Patent Document 1). It is said that such a tire facilitates the creation of helical flews of rainwater entering the circumferential grooves, so that the water evacuation performance is improved.

PRIOR ART DOCUMENT

Patent Document

Patent Document 1: Japanese Patent Application Publication No. 2005-170381 (Page 3, FIG. 2)

SUMMARY OF THE INVENTION

With the recent advent of electric vehicles and hybrid vehicles using an internal combustion engine and an electric meter in combination, reduction of noises generated by a tire has been further strongly required. Moreover, even for automobiles equipped with an internal combustion engine, the reduction of noises generated by a tire has been more strongly required than before, because noises generated by the automobiles themselves are reduced. Major noises generated by a tire include a pattern noise (pitch noise) attributable to a tread pattern, and a road noise attributable to unevenness on a road surface.

Moreover, also in the case of a tire used for such recent automobiles with reduced noises, it is necessary to ensure a braking performance not inferior to those of conventional tires.

In this respect, the present invention has been made in view of such a circumstance, and an object of the present invention is to provide a tire with which the pattern noise and the road noise are further reduced, while the water evacuation performance and the braking performance are ensured.

A feature of a tire (pneumatic tire 1010, for example) according to the present invention is summarized as the tire comprising: a circumferential groove (circumferential groove 1020, for example) extending in a tire circumferential direction (circumferential direction Tc), and a land portion (land portion 1040) being adjacent to the circumferential groove and extending in the tire circumferential direction, wherein in-groove grooves (in-groove grooves 1100, for example) which are recessed from a groove bottom (groove bottom 1020, for example) of the circumferential groove inwardly in a tire radial direction (tire radial direction Tr) are formed in the circumferential groove, each of the in-groove grooves includes an inclined portion (inclined portion 1120, for example) extending with an inclination relative to the tire circumferential direction, a groove portion (hook-shaped groove 1200 or pinhole sipe 1250) extending in an extending direction (direction A11, for example) of the inclined portion is formed in the land portion, and at least one of end portions (end portion 1300a, for example) of the groove portion in the extending direction is terminated at inside of the land portion.

In the above described feature of the present invention, the groove portion may be a narrow groove having a linear shape.

In the above described feature of the present invention, the groove portion may have a hook-like shape including: a hook groove section (hook groove section 1201) having a linear shape extending in the extending direction of the inclined portion; and a linear groove section (linear groove section 1220) which communicates with the hook groove section, and which has a linear shape extending in the tire circumferential direction.

In the above described feature of the present invention, the groove portion may be formed by a plurality of pinhole sipes (pinhole sipes 1250).

In the above described feature of the present invention, the plurality of in-groove grooves may be arranged at predetermined intervals in the tire circumferential direction, and the groove portion formed by the pinhole sipes may be formed between each pair of the inclined portions adjacent to each other in the tire circumferential direction.

In the above described feature of the present invention, the groove portion may include: a first groove portion (hook-shaped groove 1200) which is a narrow groove having a linear shape; and a second groove portion (pinhole sipes 1250) formed by a plurality of pinhole sipes, wherein the second groove portion is formed close to the circumferential groove, and the first groove portion is formed at a position which is more distant from the circumferential groove than a position of the second groove portion, and which is outside the second groove portion in a tread width direction (tread width direction Tw).

In the above described feature of the present invention, the first groove portion may have a hook-like shape including: a hook groove section (hook groove section 1210) having a linear shape extending in the extending direction in which the inclined portion extends; and a linear groove section (linear groove section 1220) which communicates with the hook groove section, and which has a linear shape extending in the tire circumferential direction.

In the above described feature of the present invention, the plurality of in-groove grooves may be arranged at predetermined intervals in the tire circumferential direction, and the second groove portion formed by the pinhole sipes may be formed between each pair of the inclined portions adjacent to each other in the tire circumferential direction.

In the above described feature of the present invention, the tire may comprise an inner land portion (land portion 2030) located closer to a tire equator line (tire equator line CL) than the land portion is, wherein a plurality of sipes (liner sipes 2270) may be formed in the inner land portion, and the plurality of sipes may not communicate with the circumferential groove adjacent to the inner land portion, but are terminated an inside of the inner land portion.

In the above described feature of the present invention, the tire may comprise an inner land portion (land portion 3030) located closer to a tire equator line (tire equator line CL) than the land portion, wherein a circumferential narrow groove (circumferential narrow groove 3260, 3270) extending in the tire circumferential direction may be formed in the inner land portion, a groove width of the circumferential narrow groove may be smaller than a groove width of the in-groove grooves, an end of the circumferential narrow groove may communicate with an inner circumferential groove extending in the tire circumferential direction, and another end of the circumferential narrow groove may be terminated at inside of a second land portion.

In the above described feature of the present invention, the tire may comprises lateral grooves (lateral grooves 4200) each extending in a tread width direction (tread width direction TW), wherein in a contact patch of the tire placed in a state where the tire is set at a standard inner pressure and a standard load is applied to the tire, a circumferential groove volume (circumferential groove volume V1) defined between the circumferential groove and a road surface may be greater than a lateral groove volume (lateral groove volume V2) defined between the lateral grooves and the road surface, and in the contact patch of the tire, a total value of lengths (length L41) of the in-groove grooves in the tread width direction may be equal to or greater than a total value of lateral groove lengths (length L42) of the lateral grooves in the tread width direction.

In the above described feature of the present invention, an angle formed (angle θ41) by the circumferential groove and a tire equator line (tire equator line CL) may be 45 degrees or smaller in a tread surface view.

In the above described feature of the present invention, an angle (angle θ42) formed by each of the lateral grooves and a straight line (line SL) perpendicular to a tire equator line (tire equator line CL) may be smaller than 45 degrees in a tread surface view.

In the above described feature of the present invention, each of the in-groove grooves may include: a high-angle groove section (high-angle groove section 5311, 5331) in which an angle (angle θ51) formed by the in-groove groove and a straight line (line L51) perpendicular to a tire equator line (tire equator line CL) is greater than a predetermined angle (45 degrees, for example); and a low-angle groove section (low-angle groove section 5312, 5332) which is continuous to the high-angle groove section and in which an angle (angle θ52) formed by the in-groove groove and the straight line is smaller than the predetermined angle, and at least two kinds of pitches (pitches PT1, PT2, for example) may be provided, where each of the pitches is a length in the tire circumferential direction from a position at which a tread surface of the tire has a predetermined shape to a position at which the predetermined shape appears again in the tire circumferential direction.

In the above described feature of the present invention, the high-angle groove section may extend in the tire circumferential direction, and the low-angle groove section may extend in a tread width direction.

In the above described feature of the present invention, the low-angle groove section may be provided on each of both ends of the high-angle groove section.

In the above described feature of the present invention, the low-angle groove section may be continuous to the land portion.

In the features of the present invention described above, the land portion may include an outer land portion (land portion 5021, 5024) located outside the circumferential groove in the tread width direction, and fine holes (fine holes 5211, 5241) recessed from the tread surface inwardly in the tire radial direction may be formed in the outer land portion.

In the features of the present invention described above, the fine holes may be located between each pair of the low-angle groove sections adjacent to each other in the tire circumferential direction.

BRIEF DESCRIPTION OF DRAWINGS

FIG. 28 is a development showing a part of a tread surface 5010 of a pneumatic tire 5001 according to a fifth embodiment of the present invention.

MODES FOR CARRYING OUT THE INVENTION

Next, embodiments of a pneumatic tire according to the present invention will be described with reference to the drawings. Specifically, descriptions are given of a first embodiment, a second embodiment, a third embodiment, a fourth embodiment, a fifth embodiment, and other embodiments.

Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

[First Embodiment]

(1.1) General Overall Configuration of Tire

Figure 1:
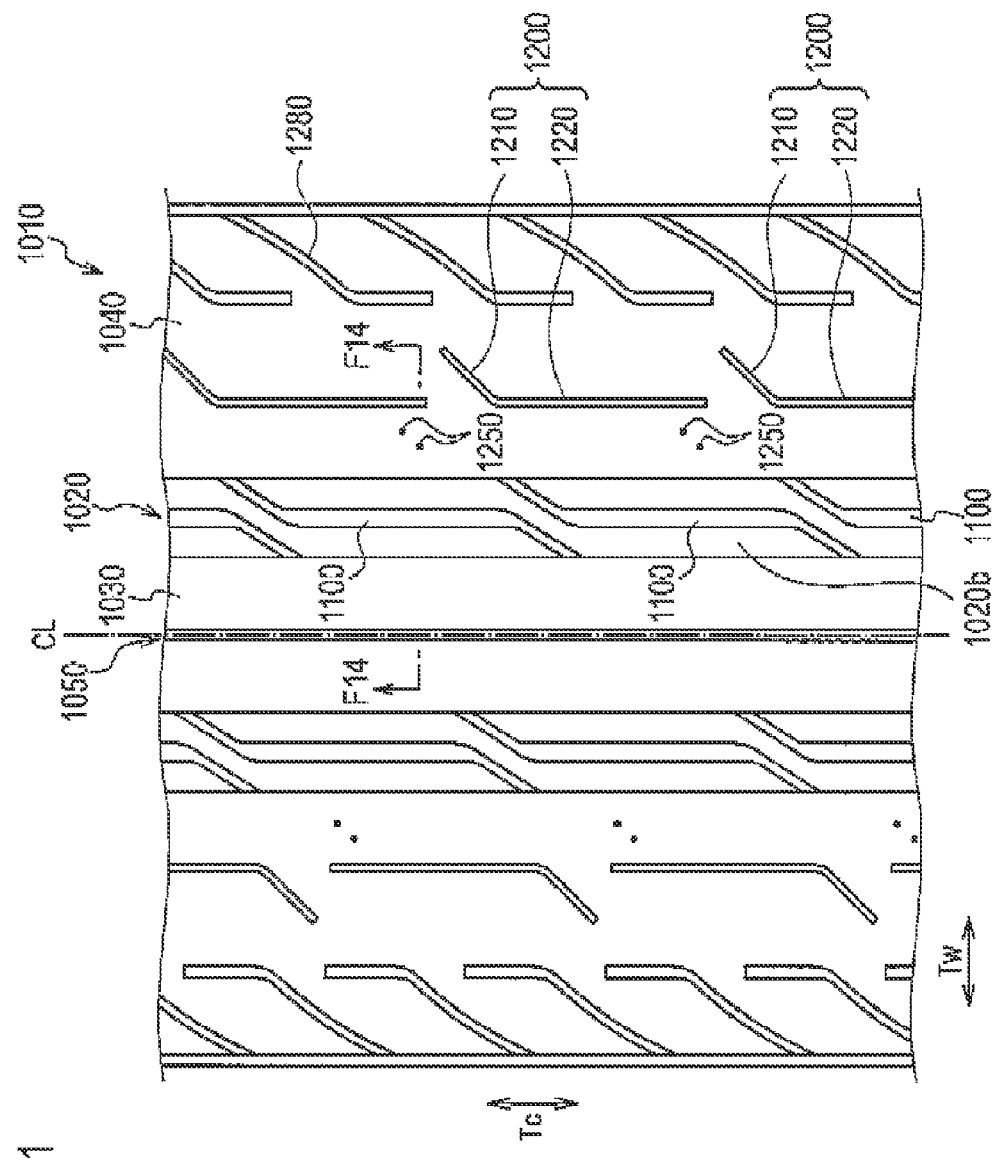
FIG. 1 is a partial development of a tread portion of a pneumatic tire 1010 according to a first embodiment of the present invention.
Figure 2:
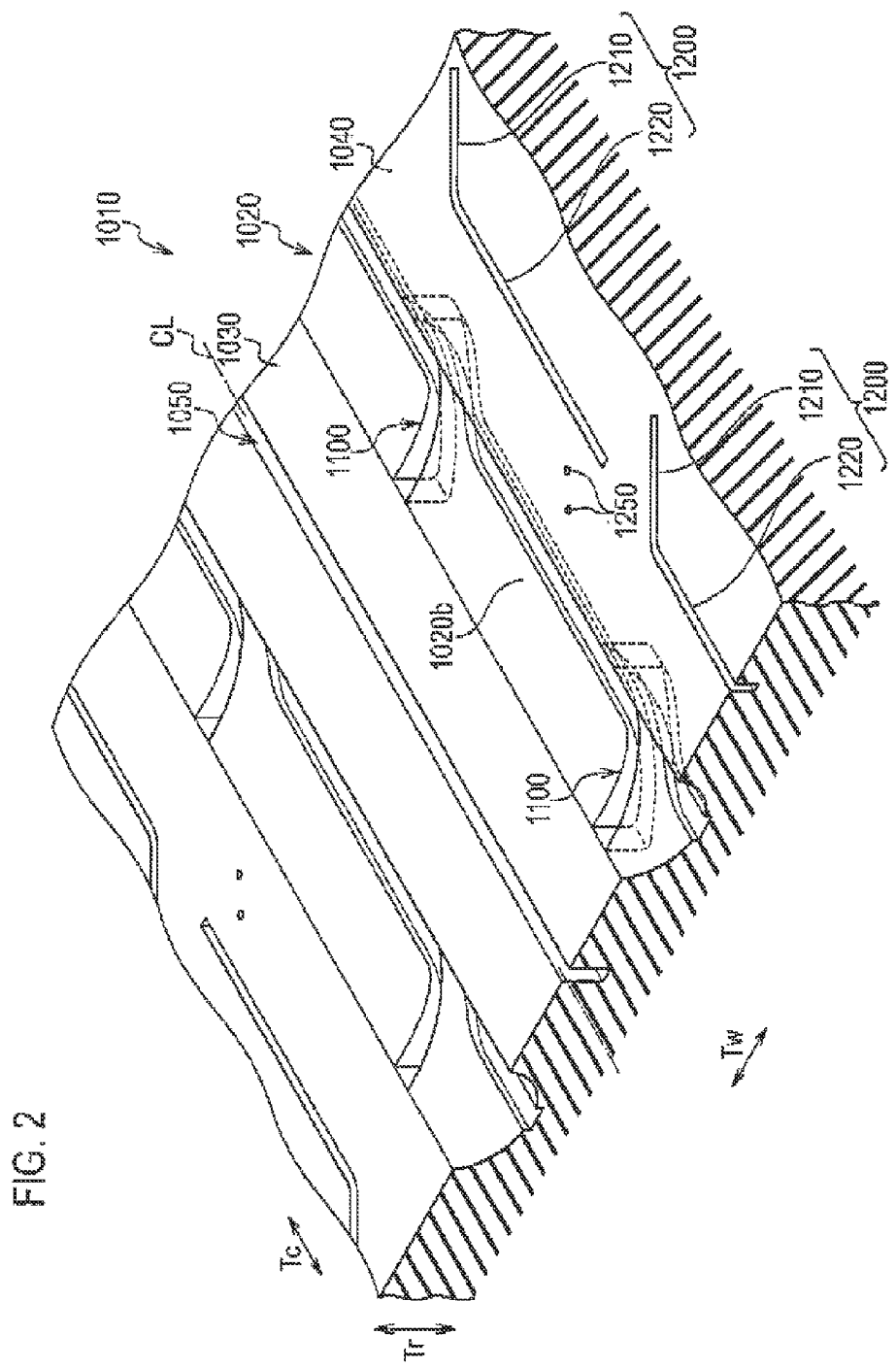
FIG. 2 is a partial perspective view of the tread portion of the pneumatic tire 1010 according to the first embodiment of the present invention.

FIG. 1 is a partial development of a tread portion of a pneumatic tire 1010 according to this embodiment. FIG. 2 is a partial perspective view of the tread portion of the pneumatic tire 1010. The pneumatic tire 1010 is a pneumatic tire mainly mounted on passenger cars. Note that the pneumatic tire 1010 mounted on a rim wheel (unillustrated) may be filled not with the air, but with an inert gas such as nitrogen gas.

Moreover, since the pneumatic tire 1010 has a point symmetric pattern with respect to a tire equator line CL, only a tread pattern on one side with respect to the tire equator line CL is described with reference to FIGS. 1 and 2.

In the pneumatic tire 1010, a circumferential groove 1020 extending in a tire circumferential direction Tc is formed. The circumferential groove 1020 is a groove having a linear shape in a tread surface view. A land portion 1030 is provided inside the circumferential groove 1020 in a tread width direction Tw.

The land portion 1030 is adjacent to the circumferential groove 1020, and extends in the tire circumferential direction Tc. The land portion 1030 is located inside the circumferential groove 1020 in the tread width direction Tw, more specifically, between the circumferential groove 1020 and a narrow groove 1050. The narrow groove 1050 has a linear shape extending in the tire circumferential direction Tc, and is formed at a position including the tire equator line CL.

On the other hand, a land portion 1040 is provided outside the circumferential groove 1020 in the tread width direction Tw. The land portion 1040 is adjacent to the circumferential groove 1020, and extends in the tire circumferential direction Tc. The land portion 1040 is located outside the circumferential groove 1020 in the tread width direction Tw.

In-groove grooves 1100 are formed at a groove bottom 1020b of the circumferential groove 1020. Specifically, the in-groove grooves 1100 are further recessed from the groove bottom 1020b inwardly in a tire radial direction Tr.

Moreover, hook-shaped grooves 1200 are formed in the land portion 1040. Each of the hook-shaped grooves 1200 has a hook groove section 1210 and a linear groove section 1220. The hook-shaped groove 1200 is formed while being spaced from the circumferential groove 1020. In this embodiment, multiple pinhole sipes 1250, specifically, two pinhole sipes 1250 are formed between the circumferential groove 1020 and each of the hook-shaped grooves 1200 in the tread width direction Tw. Note that details of shapes of the circumferential groove 1020 and the land portion 1040 are further described later.

Shoulder grooves 1280 are formed in a tread shoulder region on an outer side of the land portion 1040 in the tread width direction Tw. The multiple shoulder grooves 1280 are formed at intervals in the tire circumferential direction Tc.

(1.2) Shapes of Circumferential Groove 1020 and Land Portion 1040

Figure 3:
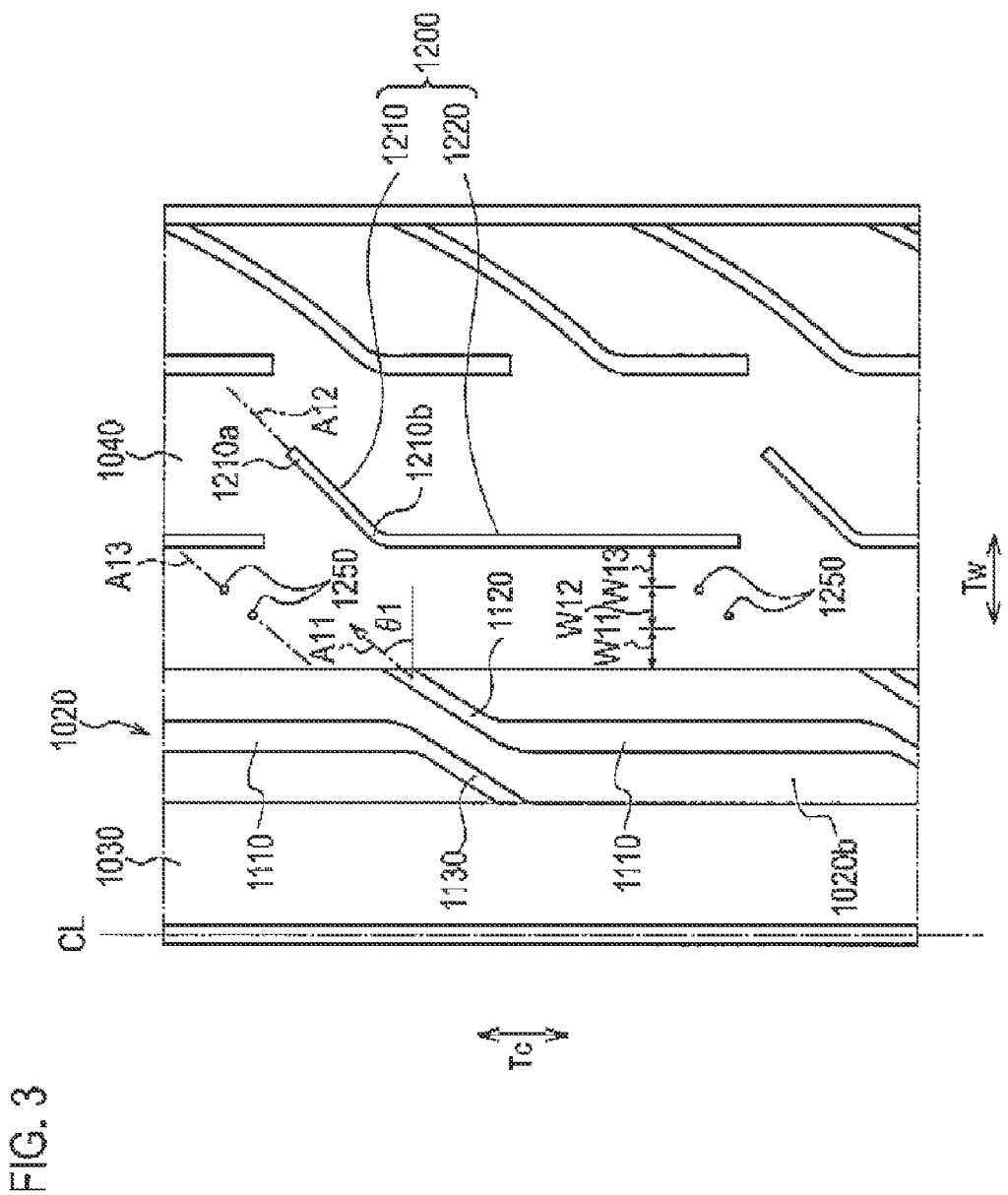
FIG. 3 is a partial development plan view of a circumferential groove 1020 and a land portion 1040 according to the first embodiment of the present invention.
Figure 4:
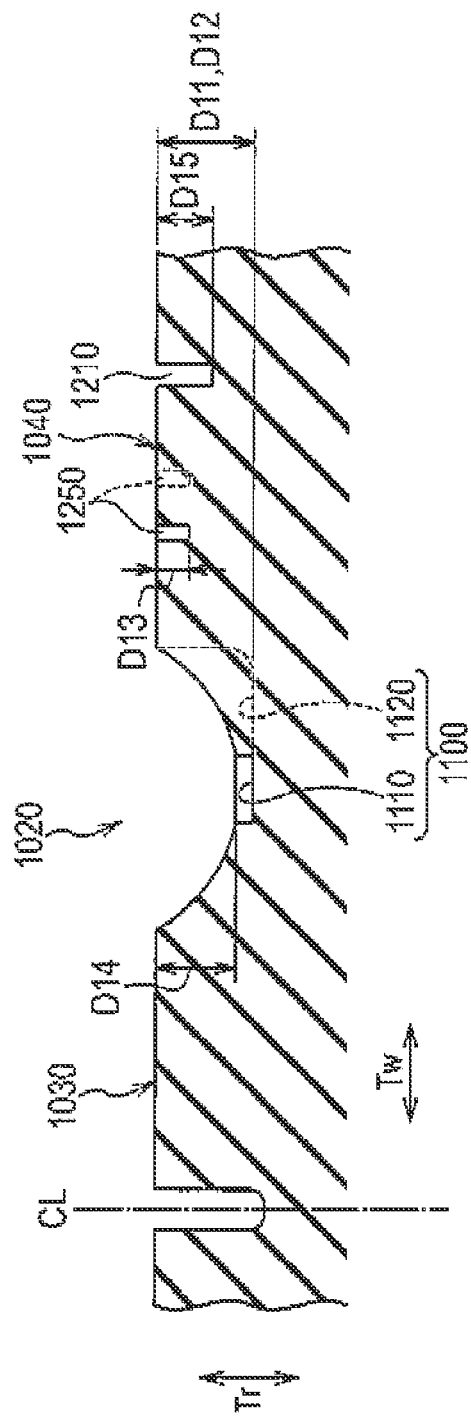
FIG. 4 is a cross-sectional view of the pneumatic tire 1010 taken along the line F14-F14 of FIG. 1 in the tread width direction.

Next, the shapes of the circumferential groove 1020 and the land portion 1040 are further described with reference to FIGS. 3 and 4. FIG. 3 is a partial development plan view of the circumferential groove 1020 and the land portion 1040. FIG. 4 is a cross-sectional view of the pneumatic tire 1010 taken along the line F14-F14 of FIG. 1 in the tread width direction.

(1.2.1) Circumferential Groove 1020

Each of the in-groove grooves 1100 formed at the groove bottom 1020b of the circumferential groove 1020 includes a linear portion 1110, an inclined portion 1120, and an inclined portion 1130. The linear portion 1110 is formed approximately at a center of the in-groove groove 1100 in the tread width direction Tw. The linear portion 1110 is a groove having a linear shape extending in the tire circumferential direction Tc.

The inclined portion 1120 and the inclined portion 1130 communicate with end portions of the linear portion 1110 in the tire circumferential direction Tc, respectively. The inclined portion 1120 and the inclined portion 1130 have shapes symmetric to each other. A maximum groove depth (D11) of the linear portion 1110 from a tread surface is equal to a maximum groove depth (D12) of the inclined portion 1120 (the inclined portion 1130) from the tread surface.

The groove bottom 1020b has an arc shape in a cross-sectional view (see FIG. 4) taken in the tread width direction Tw and the tire radial direction Tr. In other words, the groove depth of the groove bottom 1020b decreases toward the land portion 1030. Likewise, the groove depth of the groove bottom 1020b decreases toward the land portion 1040.

Moreover, since a groove depth (D12) of the inclined portion 1120 (the inclined portion 1130) is approximately constant in the tread width direction Tw, a step between the groove bottom 1020b and the inclined portion 1120 (the inclined portion 1130) gets larger toward the land portion 1040 (the land portion 1030).

The inclined portion 1120 (the inclined portion 1130) extends with an inclination relative to the tire circumferential direction Tc. Specifically, the inclined portion 1120 (the inclined portion 1130) extends in a direction A11. The inclined portion 1120 (the inclined portion 1130) reaches the land portion 1040 (the land portion 1030).

Note that an angle θ1 formed by the direction A11 and a straight line extending in the tread width direction Tw is preferably 30 degrees or greater. In addition, since the inclined portion 1120 (the inclined portion 1130) is inclined relative to the tire circumferential direction Tc, the angle θ1 is smaller than 90 degrees. In other words, the angle θ1 is preferably 30 degrees or greater and smaller than 90 degrees, and more preferably 45 degrees to 60 degrees.

(1.2.2) Land Portion 1040

As described above, the hook-shaped grooves 1200 and the pinhole sipes 1250 are formed in the land portion 1040. In this embodiment, the hook-shaped grooves 1200 and the pinhole sipes 1250 each constitute the "groove portion" specified in CLAIMS.

Each of the hook-shaped grooves 1200 includes the hook groove section 1210 and the linear groove section 1220. The hook groove section 1210 extends in an extending direction in which the inclined portion 1120 extends. Specifically, the hook groove section 1210 extends in a direction A12, and the direction A12 is approximately in parallel with the direction A11, which is the extending direction of the inclined portion 1120.

The hook groove section 1210 and the linear groove section 1220 are each a narrow groove having a linear shape. A groove width of each of the hook groove section 1210 and the linear groove section 1220 is smaller than a groove width of the circumferential groove 1020. Note that the hook groove section 1210 and the linear groove section 1220 each may be a so-called sipe, which is a narrow groove whose groove wall on onside and groove wall on the other side can be in contact with each other when the pneumatic tire 1010 is in contact with the ground.

An end portion 1210a and an end portion 1210b of the hook groove section 1210 in the extending direction thereof (the direction A12) are terminated at inside of the land portion 1040. In other words, the end portion 1210a does not extend to an end of a tread shoulder. In addition, the end portion 1210b does not extend to the circumferential groove 1020.

As shown in FIG. 4, the pinhole sipes 1250 are recessed from the tread surface inwardly in the tire radial direction Tr. A depth D13 of the pinhole sipes 1250 in the tire radial direction Tr is smaller than a depth D14 of the circumferential groove 1020 in the tire radial direction Tr. Further, the depth D13 of the pinhole sipes 1250 is still smaller than a depth D15 of the hook-shaped groove 1200 in the tire radial direction Tr.

The multiple (two in this embodiment) pinhole sipes 1250 are formed while extending in a direction A13. The direction A13 is approximately parallel with the direction A11, which is the extending direction of the inclined portion 1120.

The pinhole sipes 1250 are formed between the circumferential groove 1020 and each of the hook-shaped grooves 1200 (the linear groove sections 1220). Moreover, regarding the two pinhole sipes 1250 in the land portion 1040 between the circumferential groove 1020 and the hook-shaped groove 1200, a distance (W11 in the drawing) form the circumferential groove 1020 to the nearest pinhole sipe 1250 thereto, an interval (W12 in the drawing) between the two pinhole sipes 1250, and a distance (W13 in the drawing) from the hook-shaped groove 1200 to the nearest pinhole sipe 1250 thereto are equal to one another.

Moreover, in this embodiment, the hook-shaped groove 1200 and the pinhole sipes 1250 are formed at positions which are not on an extension line of the direction A11, which is the extending direction of the inclined portion 1120. In other words, neither the hook-shaped groove 1200 nor the pinhole sipes 1250 are formed on the extension line of the direction A11, but only the land portion 1040 is provided on the extension line.

Moreover, in this embodiment, the pinhole sipes 1250 are formed between each pair of the inclined portions 1120 adjacent to each other in the tire circumferential direction Tc.

(1.3) Operations and Effects

According to the pneumatic tire 1010, the in-groove groove 1100 includes the inclined portion 1120 extending with an inclination relative to the tire circumferential direction Tc. Moreover, in the land portion 1040, the hook-shaped grooves 1200 (the hook groove sections 1210) or the pinhole sipes 1250 are formed while extending in the extending direction (the direction A11) in which the inclined portions 1120 extend. With such shapes, rainwater which enters the circumferential groove 1020 and flows out along the in-groove grooves 1100 to the land portion 1040 easily flows because the rainwater is not subjected to a large resistance along the hook groove sections 1210 or the pinhole sipes 1250. For this reason, the water evacuation performance can be easily ensured.

The end portion 1210a and the end portion 1210b of each of the hook groove sections 1210 are terminated at inside of the land portion 1040. Moreover, the two pinhole sipes 1250 are formed between the circumferential groove 1020 and each of the hook-shaped grooves 1200. For this reason, the pattern noise (the pitch noise) can be reduced as compared with a case where lug grooves are formed which extend across the land portion 1040 in the tread width direction Tw. Moreover, the deformation (folding) of the land portion 1040 at the time of braking is reduced as compared with the case where the lug grooves are formed. Hence, the braking performance can be easily ensured.

Moreover, compression rigidity of the land portion 1040 is moderately lowered by the hook-shaped grooves 1200 and the pinhole sipes 1250 formed in the land portion 1040. For this reason, the road noise can be reduced.

In sum, the pneumatic tire 1010 makes it possible to further reduce the pattern noise and the road noise, while the water evacuation performance and the braking performance are ensured.

In this embodiment, each of the hook groove sections 1210 has a linear shape. For this reason, rainwater which flows out of the in-groove groove 1100 to the land portion 1040 can be guided smoothly, so that the water evacuation performance of the pneumatic tire 1010 is improved.

In this embodiment, the hook-shaped grooves 1200 are formed which are each constituted of the hook groove section 1210 and the linear groove section 1220. For this reason, rainwater which enters the space between the land portion 1040 and the road surface flows along the linear groove sections 1220, and is evacuated thorough the hook groove sections 1210 to the outside of the land portion 1040. In other words, the water evacuation performance of the pneumatic tire 1010 is further improved. In addition, although such effects are limited in the case of the pinhole sipes 1250, the deformation (folding) of the land portion 1040 can be more reliably reduced in this case than in a case of the hook groove sections 1210.

In this embodiment, the pinhole sipes 1250 are formed between each pair of the inclined portions 1120 adjacent to each other in the tire circumferential direction Tc. For this reason, the difference in compression rigidity of the pneumatic tire 1010 in the tire circumferential direction Tc can be reduced.

In this embodiment, each hook-shaped groove 1200 is formed at a position which is more distant from the circumferential groove 1020 than the positions of the pinhole sipes 1250 are, and which is outside the pinhole sipes 1250 in the tread width direction Tw. The flow velocity of rainwater flowing out of the circumferential groove 1020 is high in the region in which the pinhole sipes 1250 are formed and which is close to the circumferential groove 1020 (the in-groove grooves 1100). Hence, the rainwater can be guided in the direction A13 by discontinuous groove portions such as the pinhole sipes 1250. Moreover, the pinhole sipes 1250 are advantageous over linear grooves such as the hook groove sections 1210, in terms of reduction of the deformation (folding) of the land portion 1040, as described above.

On the other hand, in the region in which the hook groove sections 1210 are formed and which is distant from the circumferential groove 1020, the flow velocity of rainwater flowing out of the circumferential groove 1020 is lower than that in the region in which the pinhole sipes 1250 are formed. Hence, a sufficient water evacuation performance can be ensured by forming the linear groove sections.

(1.4) Modifications of First Embodiment

Figure 5:
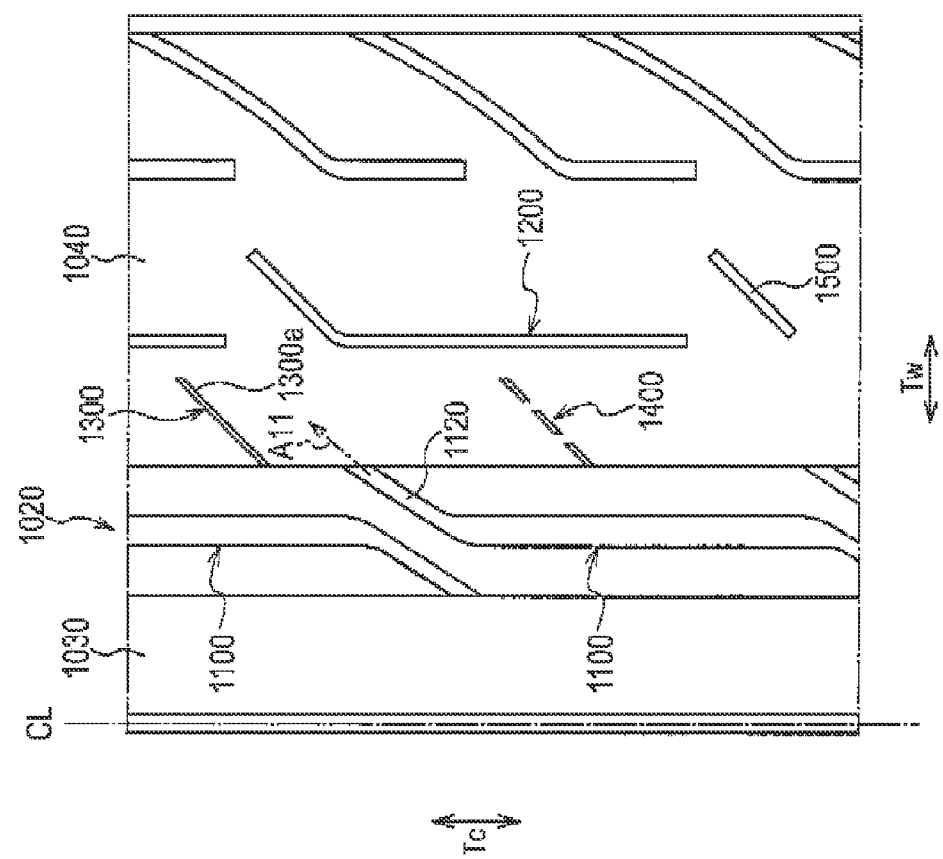
FIG. 5 is a view showing shapes of groove portions according to modifications of the first embodiment of the present invention.

For example, the first embodiment of the present invention can be modified as follows. FIG. 5 shows shapes of groove portions according to modifications of the first embodiment of the present invention. In the above-described first embodiment, the both ends of each of the hook-shaped grooves 1200 (the hook groove sections 1210) and each of the pinhole sipes 1250 are terminated at inside of the land portion 1040. However, one end portion 1300a may communicate with the circumferential groove 1020 as in the case of a groove portion 1300 or a groove portion 1400 shown in FIG. 5.

Moreover, the groove portion may be formed not by circular holes such as pinholes, but by discontinuous linear multiple grooves as in the case of the groove portion 1400.

In the above-described first embodiment, the hook-shaped groove 1200 constituted of the hook groove section 1210 and the linear groove section 1220 is formed in the land portion 1040. However, a groove portion having a linear shape may be formed which extends in the extending direction (the direction A11) of the inclined portion 1120, as in the case of a groove portion 1500 shown in FIG. 5.

Moreover, in the above-described first embodiment, the inclined portion 1120 (the inclined portion 1130) reaches the land portion 1040 (the land portion 1030). However, the inclined portion 1120 does not necessarily need to reach the land portion 1040.

[Second Embodiment]

Next, the second embodiment is described. Portions the same as those in the above-described embodiment are omitted as appropriate.

(2.1) General Overall Configuration of Tire

Figure 6:
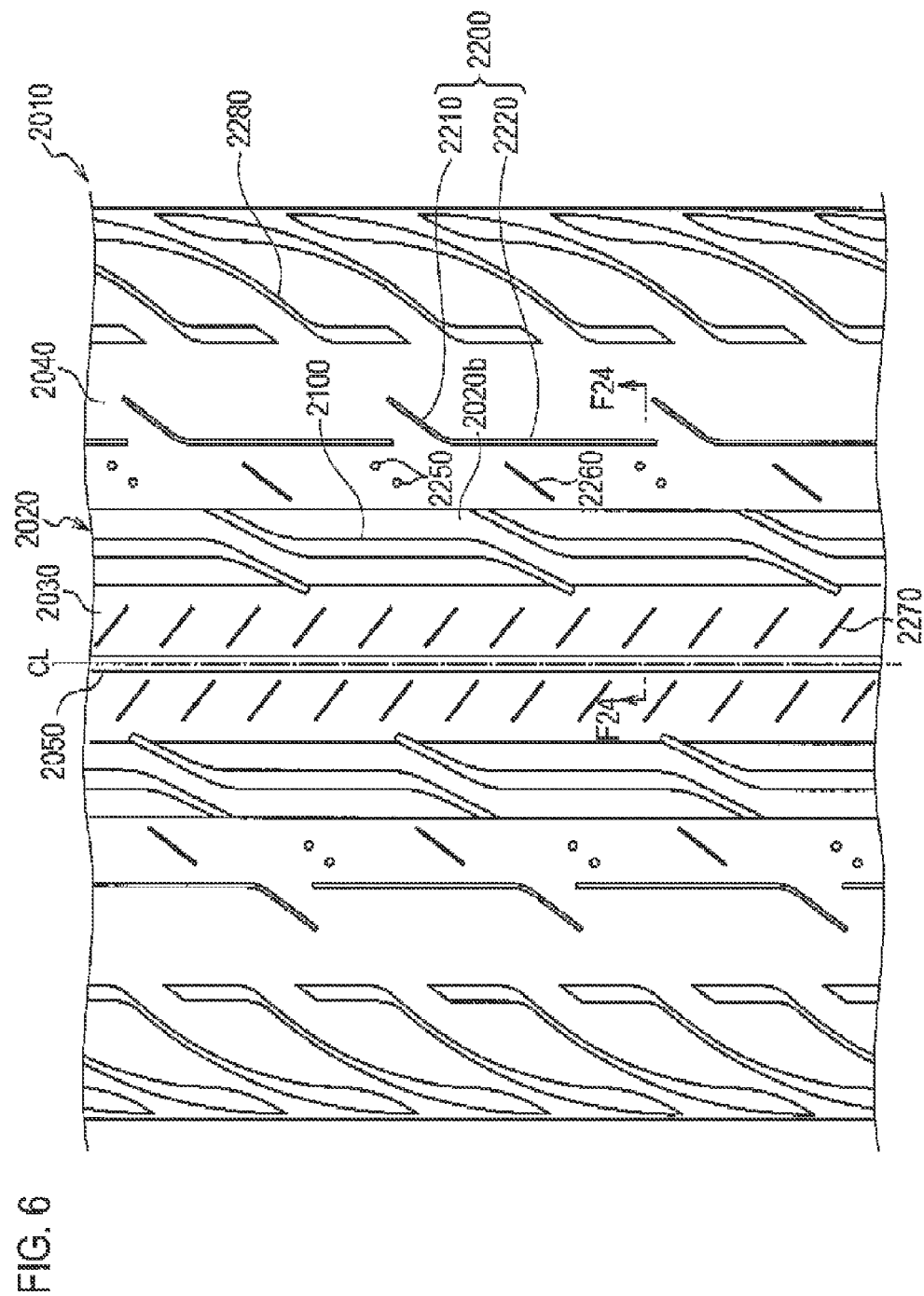
FIG. 6 is a partial development of a tread portion of a pneumatic tire 2010 according to a second embodiment of the present invention.
Figure 7:
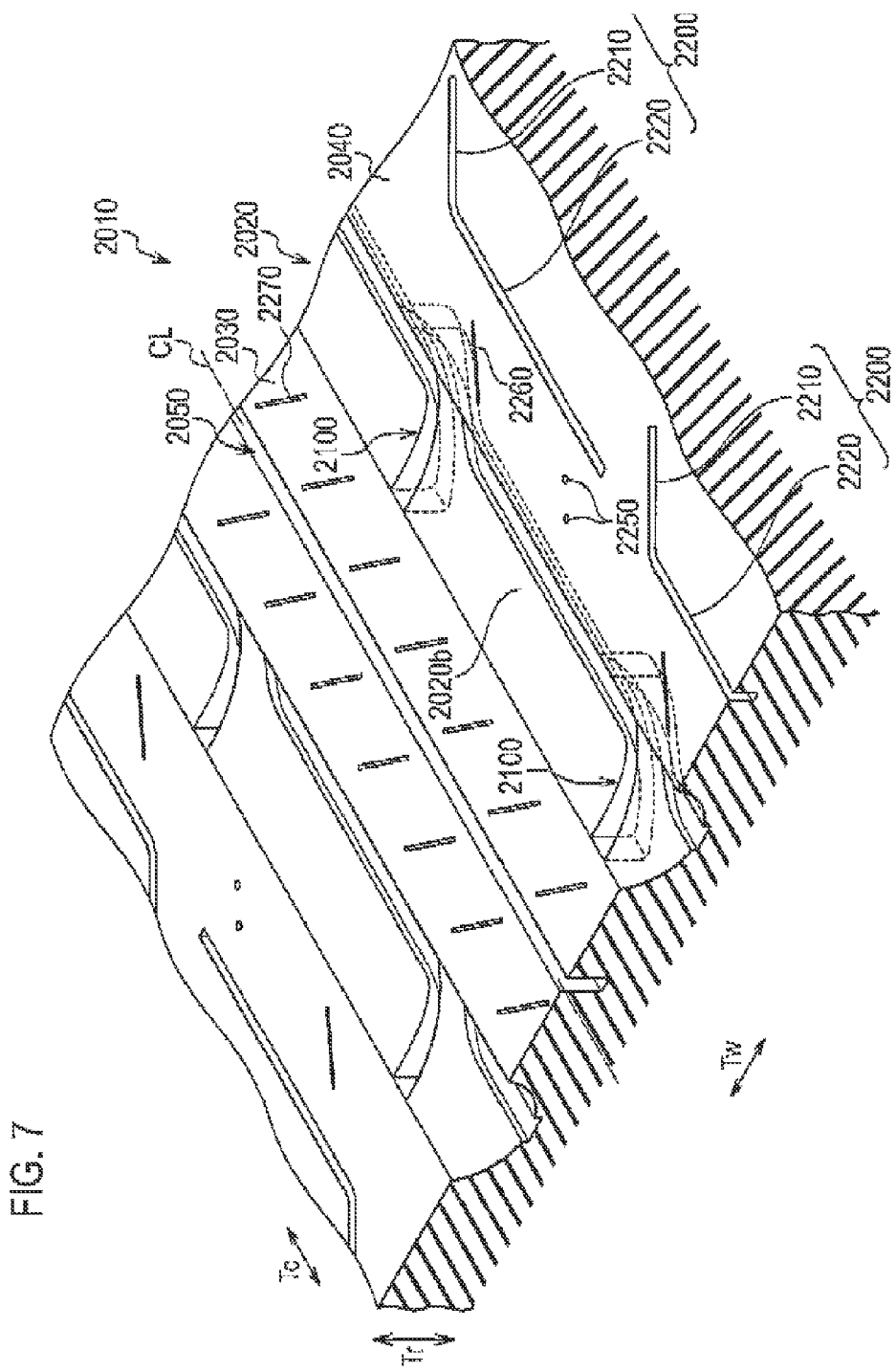
FIG. 7 is a partial perspective view of the tread portion of the pneumatic tire 2010 according to the second embodiment of the present invention.

FIG. 6 is a partial development of a tread portion of a pneumatic tire 2010 according to this embodiment. FIG. 7 is a partial perspective view of the tread portion of the pneumatic tire 2010. The pneumatic tire 2010 is a pneumatic tire mainly mounted on passenger cars. Note that the pneumatic tire 2010 mounted on a rim wheel (unillustrated) may be filled not with the air, but with an inert gas such as nitrogen gas.

In the pneumatic tire 2010, a circumferential groove 2020 extending in the tire circumferential direction Tc is formed. The circumferential groove 2020 is a groove having a linear shape in a tread surface view. A land portion 2030 is provided inside the circumferential groove 2020 in the tread width direction Tw. In this embodiment, the land portion 2030 constitutes the "inner land portion" specified in CLAIMS.

The land portion 2030 is adjacent to the circumferential groove 2020, and extends in the tire circumferential direction Tc. The land portion 2030 is located inside the circumferential groove 2020 in the tread width direction Tw. A narrow groove 2050 is formed at a center of the land portion 2030 in the tread width direction Tw. The narrow groove 2050 has a linear shape extending in the tire circumferential direction Tc, and is formed at a position including the tire equator line CL.

Moreover, multiple linear sipes 2270 are formed in the land portion 2030. The linear sipes 2270 are formed with an inclination relative to the tire circumferential direction Tc.

On the other hand, a land portion 2040 is provided outside the circumferential groove 2020 in the tread width direction Tw. The land portion 2040 is adjacent to the circumferential groove 2020, and extends in the tire circumferential direction Tc. The land portion 2040 is located outside the circumferential groove 2020 in the tread width direction Tw. In this embodiment, the land portion 2040 constitutes the "land portion" specified in CLAIMS.

In-groove grooves 2100 are formed at a groove bottom 2020b of the circumferential groove 2020. Specifically, the in-groove grooves 2100 are further recessed from the groove bottom 2020b inwardly in the tire radial direction Tr.

Moreover, hook-shaped grooves 2200 are formed in the land portion 2040. Each of the hook-shaped grooves 2200 includes a hook groove section 2210 and a linear groove section 2220. The hook-shaped groove 2200 is formed while being spaced from the circumferential groove 2020. In this embodiment, multiple pinhole sipes 2250, specifically, two pinhole sipes 2250 are formed between the circumferential groove 2020 and each of the hook-shaped grooves 2200 in the tread width direction Tw.

Shoulder grooves 2280 are formed in a tread shoulder region on an outer side of the land portion 2040 in the tread width direction Tw. The multiple shoulder grooves 2280 are formed at intervals in the tire circumferential direction Tc.

(2.2) Shapes of Circumferential Groove 2020, Land Portion 2030, and Land Portion 2040

Figure 8:
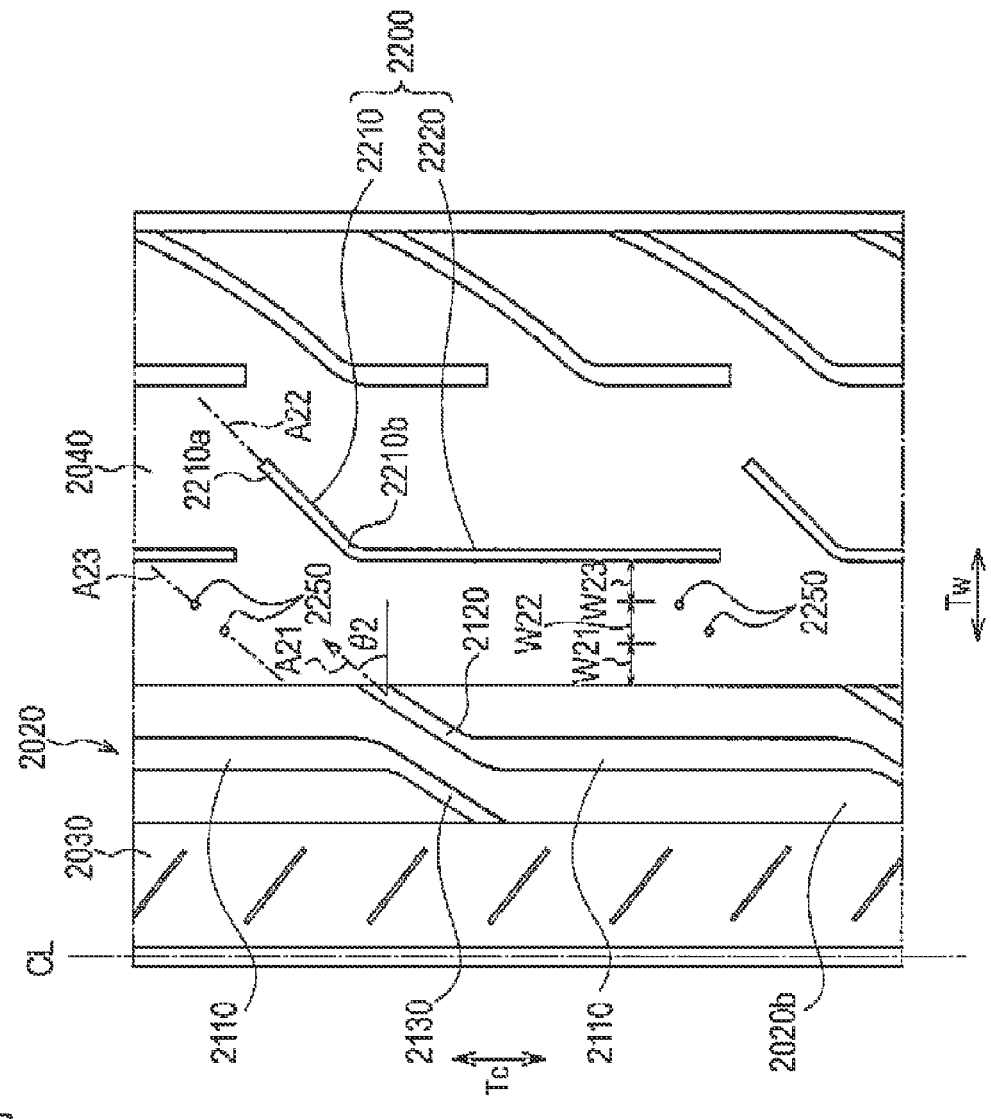
FIG. 8 is a partial development plan view of a circumferential groove 2020 and a land portion 2040 according to the second embodiment of the present invention.
Figure 9:
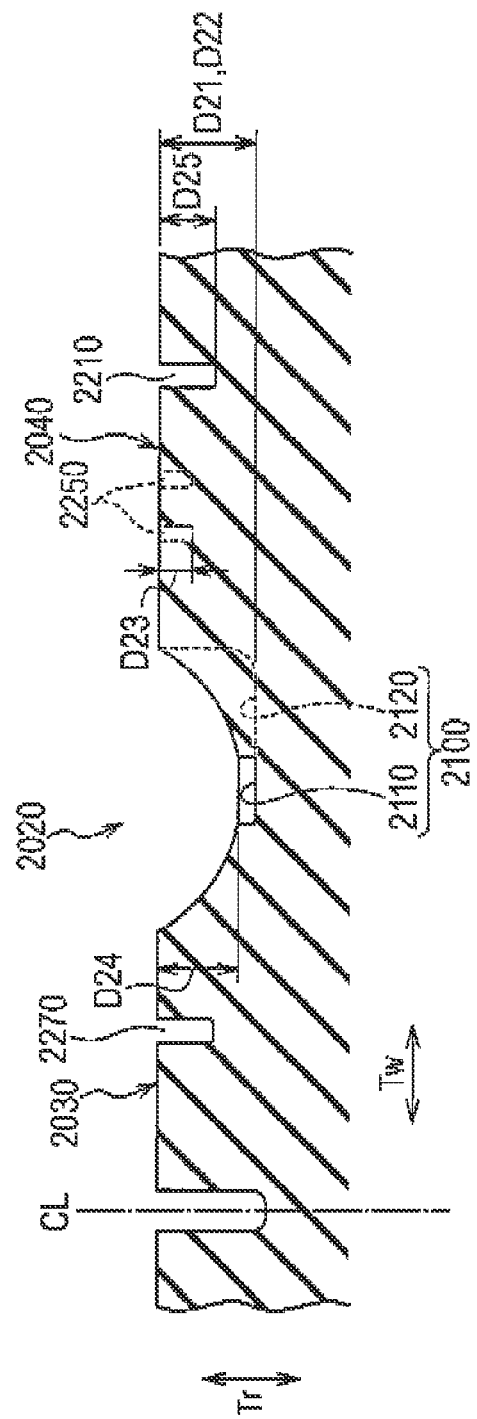
FIG. 9 is a cross-sectional view of the pneumatic tire 2010 taken along the line F24-F24 of FIG. 6 in the tread width direction.

Next, shapes of the circumferential groove 2020, the land portion 2030, and the land portion 2040 are further described with reference to FIGS. 6 to 9. FIG. 8 is a partial development plan view of the circumferential groove 2020 and the land portion 2040. FIG. 9 is a cross-sectional view of the pneumatic tire 2010 taken along the line F24-F24 of FIG. 6 in the tread width direction.

(2.2.1) Circumferential Groove 2020

The circumferential groove 2020 has the same configuration as that of the circumferential groove 1020 of the above-described first embodiment. Hence, description of the circumferential groove 2020 is omitted.

(2.2.2) Land Portion 2030

As shown in FIGS. 6, 7, and 9, the land portion 2030 is located closer to the tire equator line CL than the land portion 2040 is. Each of the linear sipes 2270 formed in the land portion 2030 does not communicate with the circumferential groove 2020 adjacent to the land portion 2030, but is terminated at inside of the land portion 2030. In other words, both ends of the linear sipe 2270 are not opened to the circumferential groove 2020, but terminated at inside of the land portion 2030.

The multiple linear sipes 2270 are formed in the tire circumferential direction Tc. An extending direction of each of the linear sipes 2270 is inclined relative to the tire circumferential direction Tc as described above. In this embodiment, extending directions of the multiple linear sipes 2270 are the same. In addition, the linear sipes 2270 are formed on both sides with respect to the narrow groove 2050 (the tire equator line CL). Linear sipes 2270 formed on one side with respect to the narrow groove 2050 and linear sipes 2270 on the other side are formed to be aligned in straight lines.

(2.2.3) Land Portion 2040

The land portion 2040 has the same configuration as that of the land portion 1040 of the above-described first embodiment. Hence, description of the land portion 2040 is omitted.

(2.3) Operations and Effects

According to the pneumatic tire 2010, the multiple linear sipes 2270 terminated at inside of the land portion 2030 are formed in the land portion 2030, which is located closer to the tire equator line CL than the land portion 2040 is. This improves the wear resistance of the land portion 2030 which is located in the central region in the tread width direction Tw and which contributes the drive performance of the pneumatic tire 2010. Specifically, since the formation of the multiple linear sipes 2270 in the land portion 2030 improves the followability (fitness) of the land portion 2030 to a road surface shape, wear of the land portion 2030 by a road surface is reduced. Consequently, the drive performance of the pneumatic tire 2010 can be retained for a long period.

In sum, the pneumatic tire 2010 makes it possible to further reduce the pattern noise and the road noise, while the water evacuation performance, the braking performance, and the drive performance are ensured.

(2.4) Modifications of Second Embodiment

For example, the second embodiment of the present invention can be modified as follows. FIGS. 10 to 14 show shapes of land portions 2030 of pneumatic tires according to modifications of the second embodiment of the present invention. Note that the shapes other than that of the land portion 2030 are the same as those in the above-described pneumatic tire 2010.

Figure 10:
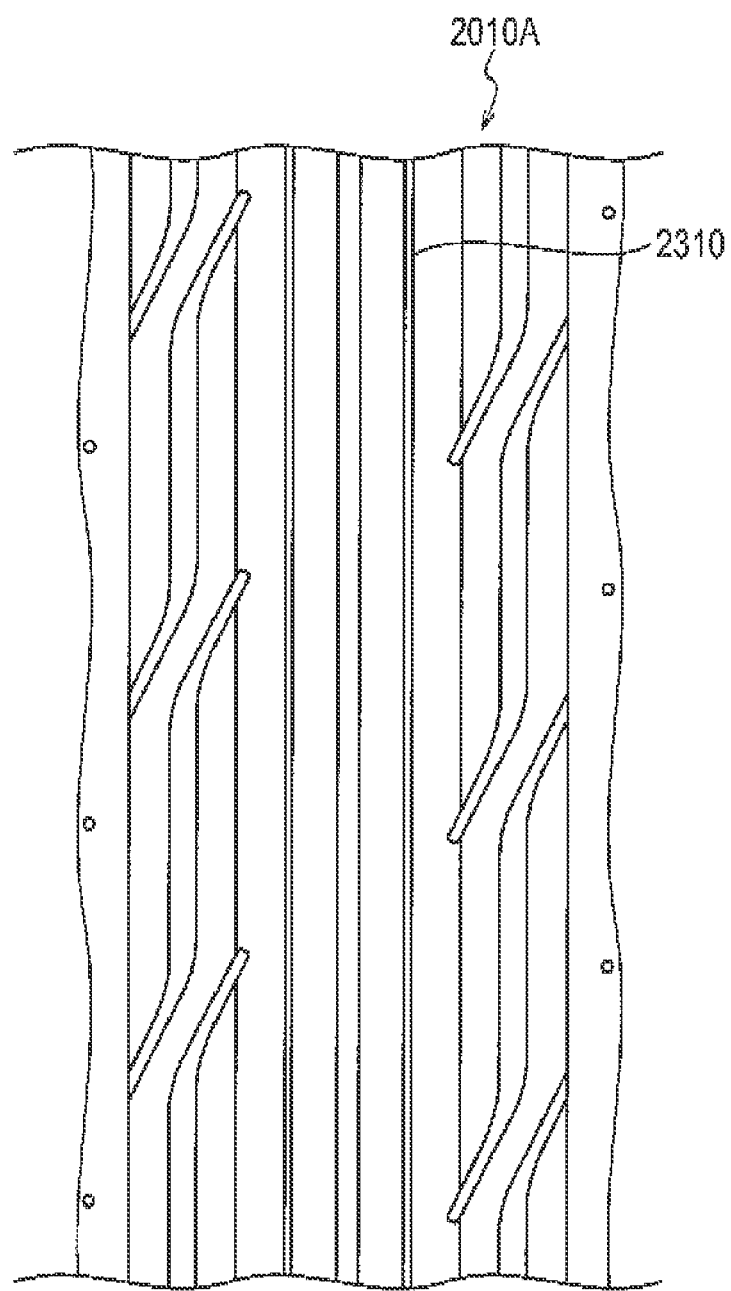
FIG. 10 is a view showing a shape of a land portion 2030 of a pneumatic tire 2010A according to a modification of the second embodiment of the present invention.

In a pneumatic tire 2010A shown in FIG. 10, a linear sipe 2310 is formed. The linear sipe 2310 is a single sipe having a linear shape extending in parallel with the tire circumferential direction Tc.

Figure 11:
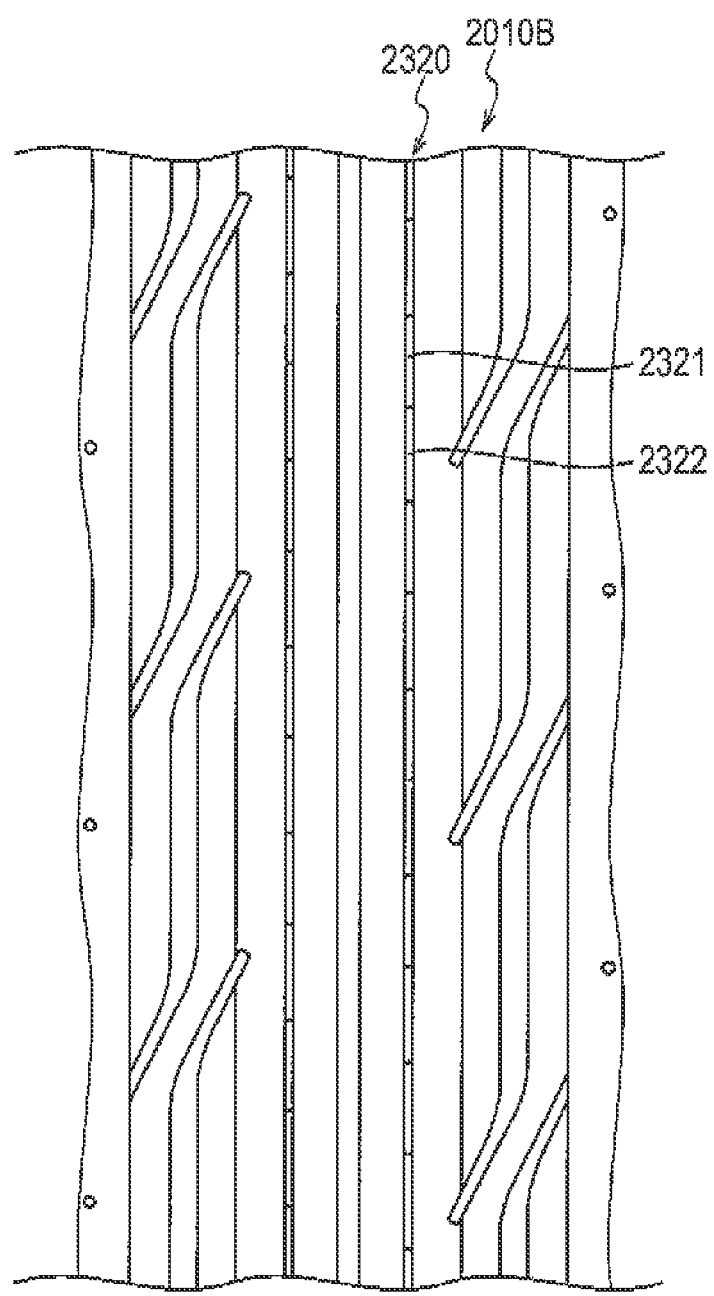
FIG. 11 is a view showing a shape of a land portion 2030 of a pneumatic tire 2010B according to a modification of the second embodiment of the present invention.

In a pneumatic tire 2010B shown in FIG. 11, a linear sipe 2320 is formed. The linear sipe 2320 is a single sipe having a linear shape extending in parallel with the tire circumferential direction Tc, in the same manner as in the linear sipe 2310, except that shallow bottom portions 2321 and deep bottom portions 2322 are repeated in the tire circumferential direction Tc. A groove depth of the deep bottom portions 2322 is greater than a groove depth of the shallow bottom portions 2321.

Figure 12:
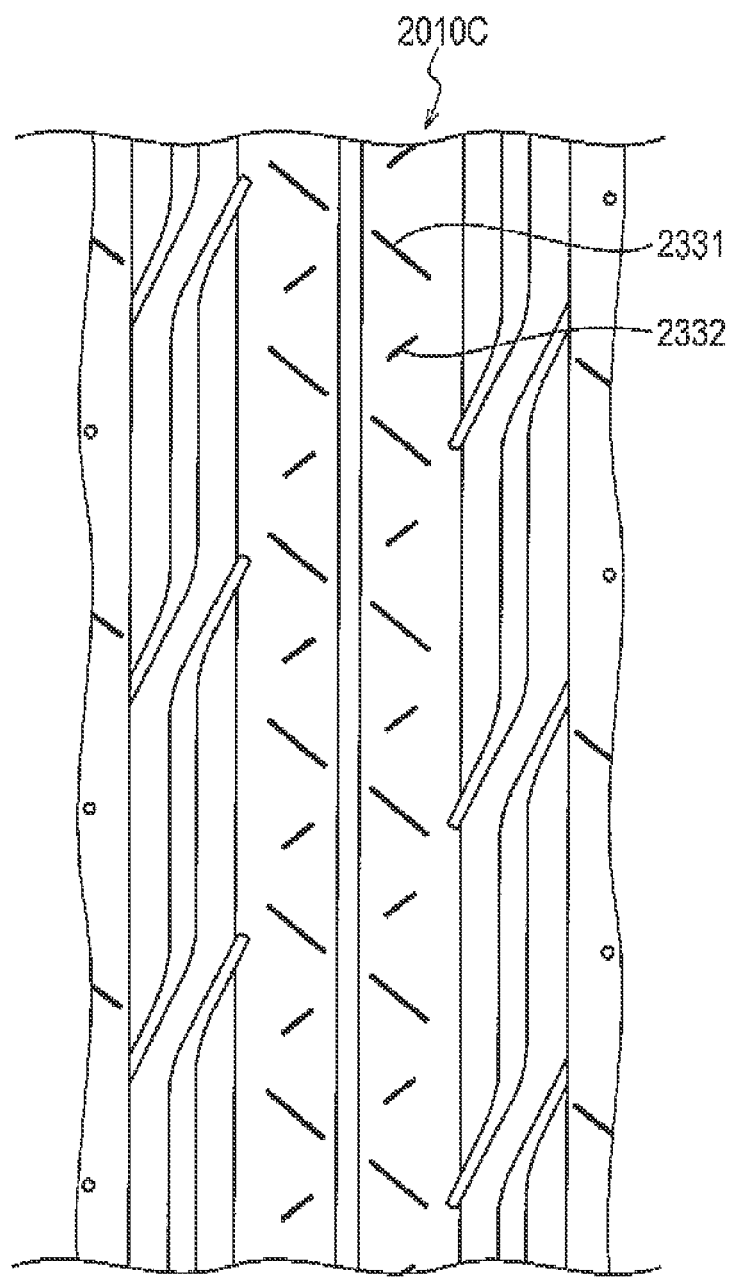
FIG. 12 is a view showing a shape of a land portion 2030 of a pneumatic tire 20100 according to a modification of the second embodiment of the present invention.

In a pneumatic tire 2010C shown in FIG. 12, multiple linear sipes 2331 and multiple linear sipes 2332 are formed. The linear sipes 2331 and the linear sipes 2332 are formed with inclinations relative to the tire circumferential direction Tc. The extending direction is different between the linear sipes 2331 and the linear sipes 2332. Specifically, the linear sipes 2331 and the linear sipes 2332 extend in directions opposite to each other with respect to the tread width direction Tw. Moreover, the linear sipes 2331 are longer than the linear sipes 2332.

Figure 13:
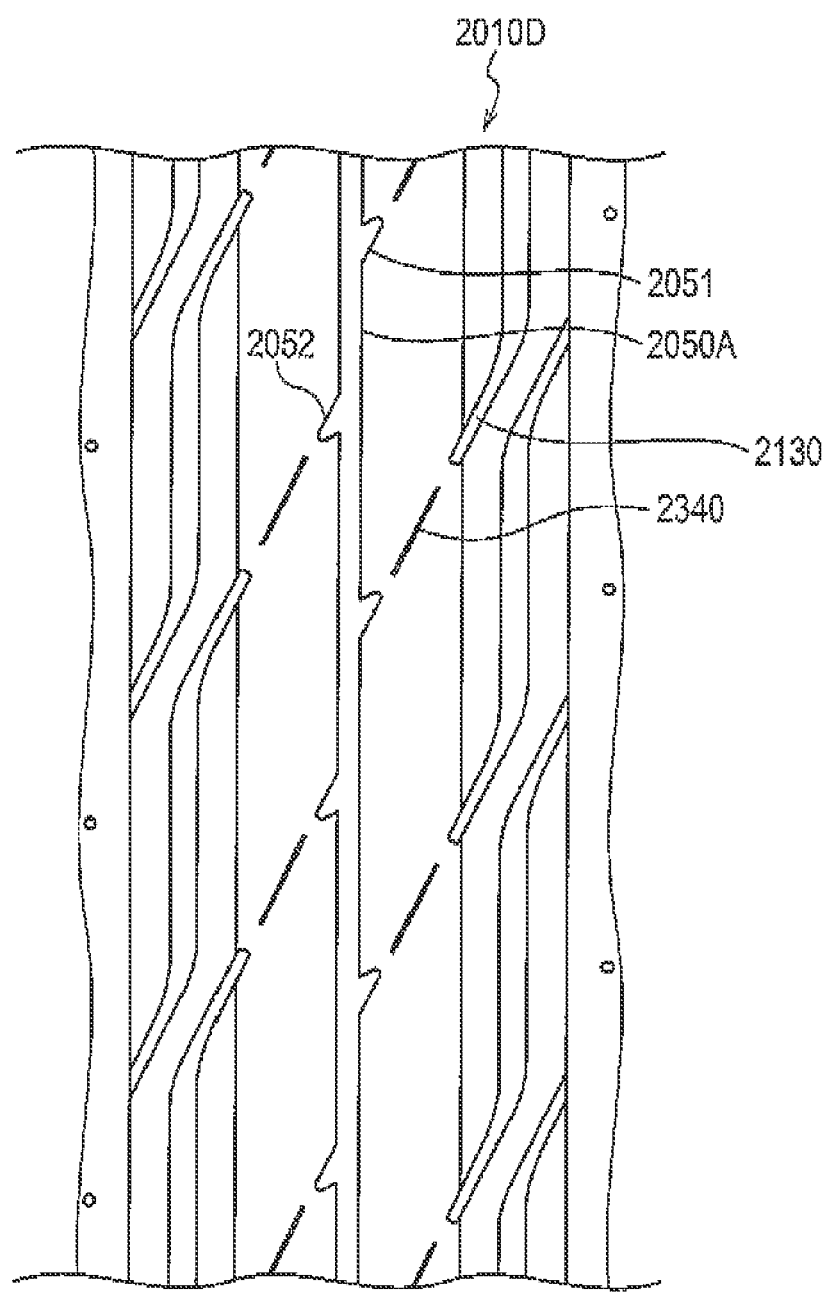
FIG. 13 is a view showing a shape of a land portion 2030 of a pneumatic tire 2010D according to a modification of the second embodiment of the present invention.

In a pneumatic tire 2010D shown in FIG. 13, multiple linear sipes 2340 are formed. An extending direction of the linear sipes 2340 is the same as the extending direction of the inclined portions 2130 of the in-groove grooves 2100. Moreover, a narrow groove 2050A including multiple recessed portions 2051 and multiple recessed portions 2062 is formed in the pneumatic tire 2010D. The recessed portions 2051 and the recessed portions 2052 are formed on extension lines of the linear sipes 2340. The inclined portion 2130 is located on one end side of each of the linear sipes 2340, and one of the recessed portions 2051 or the recessed portions 2052 is located on the other end side of the linear sipe 2340.

Figure 14:
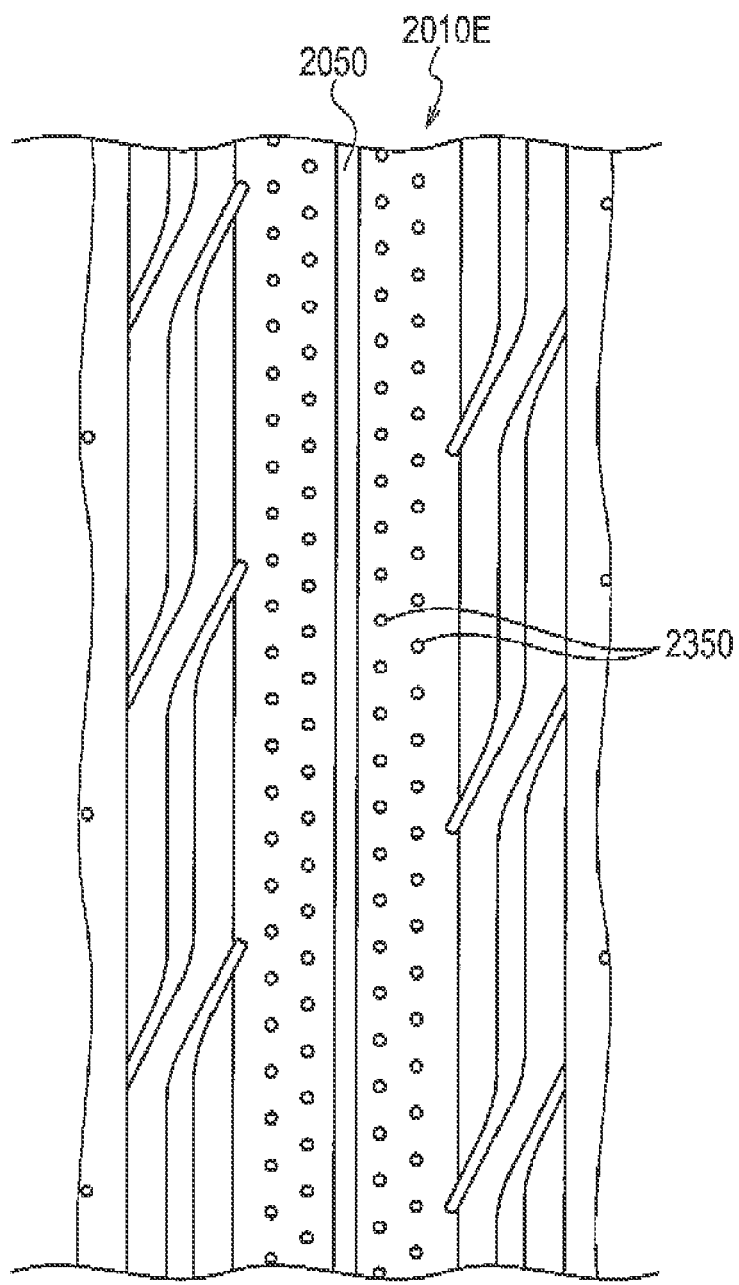
FIG. 14 is a view showing a shape of a land portion 2030 of a pneumatic tire 2010E according to a modification of the second embodiment of the present invention.

In a pneumatic tire 2010E shown in FIG. 14, multiple pinhole sipes 2350 are formed. The multiple pinhole sipes 2350 are formed so as to be located on straight lines extending in the tire circumferential direction Tc, so that the pinhole sipes 2350 forms four sipe rows extending in the tire circumferential direction Tc.

The pneumatic tires 2010A to 2010E as described above also make it possible to improve the wear resistance of the land portion 2030 which is located in the central region in the tread width direction Tw and which contributes the drive performance, as in the case of the pneumatic tire 2010.

Moreover, the land portion 2030 (the second land portion) is provided at the position including the tire equator line CL in each of the above-described pneumatic tires 2010 and 2010A to 2010E. However, the land portion 2030 does not necessarily need to be provided at a position including the tire equator line CL, and the land portion 2030 only needs to be provided at a position other than the tread shoulder portion.

[Third Embodiment]

Next, the third embodiment is described. Portions the same as those in any of the above-described embodiments are omitted as appropriate.

(3.1) General Overall Configuration of Tire

Figure 15:
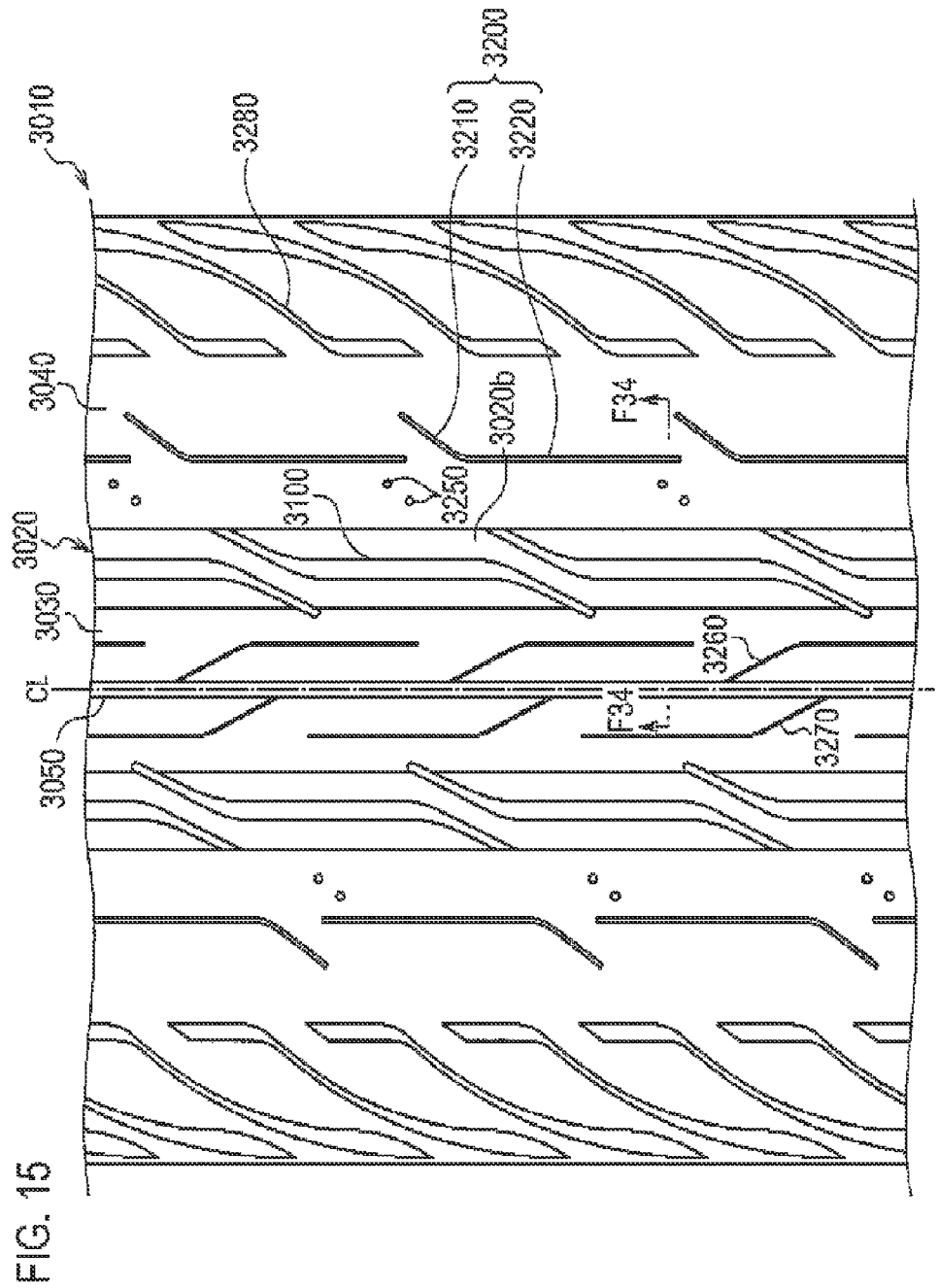
FIG. 15 is a partial development of a tread portion of a pneumatic tire 3010 according to a third embodiment of the present invention.
Figure 16:
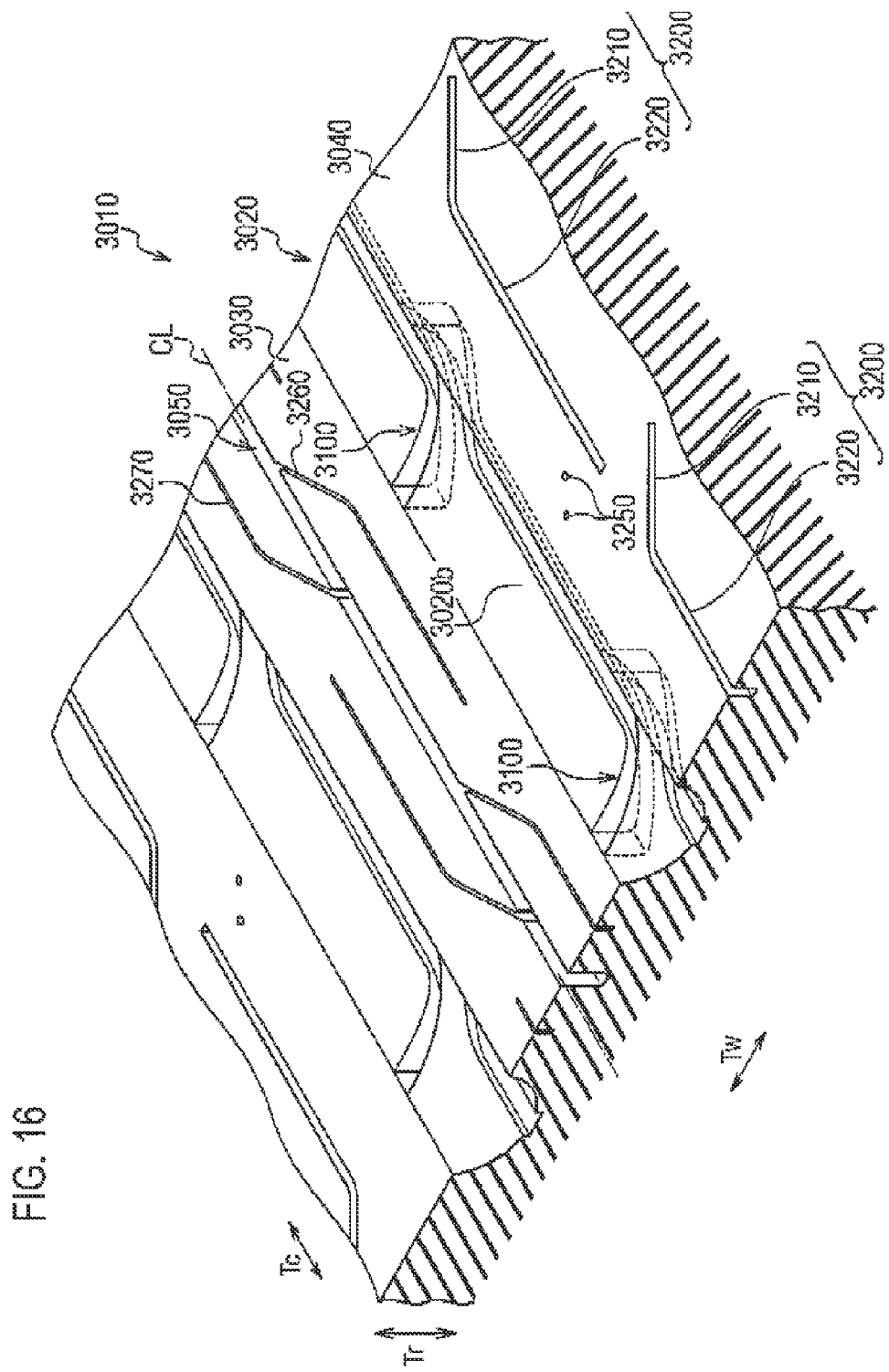
FIG. 16 is a partial perspective view of the tread portion of the pneumatic tire 3010 according to the third embodiment of the present invention.

FIG. 15 is a partial development of a tread portion of a pneumatic tire 3010 according to this embodiment. FIG. 16 is a partial perspective view of the tread portion of the pneumatic tire 3010. The pneumatic tire 3010 is a pneumatic tire mainly mounted on passenger cars. Note that the pneumatic tire 3010 mounted on a rim wheel (unillustrated) may be filled not with the air, but with an inert gas such as nitrogen gas.

In the pneumatic tire 3010, a circumferential groove 3020 extending in the tire circumferential direction T is formed. The circumferential groove 3020 is a groove having a linear shape in a tread surface view. In this embodiment, the circumferential groove 3020 constitutes the "circumferential groove" specified in CLAIMS.

A land portion 3030 is provided inside the circumferential groove 3020 in the tread width direction Tw. In this embodiment, the land portion 3030 constitutes the "inner land portion" specified in CLAIMS.

The land portion 3030 is adjacent to the circumferential groove 3020, and extends in the tire circumferential direction Tc. The land portion 3030 is located inside the circumferential groove 3020 in the tread width direction Tw. A narrow groove 3050 is formed at a center of the land portion 3030 in the tread width direction Tw. The narrow groove 3050 has a linear shape extending in the tire circumferential direction Tc, and is formed at a position including the tire equator line CL. In this embodiment, the narrow groove 3050 constitutes the "inner circumferential groove" specified in CLAIMS.

Moreover, multiple circumferential narrow grooves 3260 and multiple circumferential narrow grooves 3270 are formed in the land portion 3030. The circumferential narrow grooves 3260 are formed on one side of the land portion 3030 with respect to the narrow groove 3050, and the circumferential narrow grooves 3270 are formed on the other side of the land portion 3030 with respect to the narrow groove 3060.

On the other hand, a land portion 3040 is provided outside the circumferential groove 3020 in the tread width direction Tw. The land portion 3040 is adjacent to the circumferential groove 3020, and extends in the tire circumferential direction Tc. The land portion 3040 is located outside the circumferential groove 3020 in the tread width direction Tw. In this embodiment, the land portion 3040 constitutes the "land portion" specified in CLAIMS.

In-groove grooves 3100 are formed in a groove bottom 3020b of the circumferential groove 3020. Specifically, the in-groove grooves 3100 are further recessed from the groove bottom 3020b inwardly in the tire radial direction Tr.

Moreover, hook-shaped grooves 3200 are formed in the land portion 3040. Each of the hook-shaped grooves 3200 has a hook groove section 3210 and a linear groove section 3220. The hook-shaped groove 3200 is formed while being spaced from the circumferential groove 3020. In this embodiment, multiple pinhole sipes 3250, specifically, two pinhole sipes 3250 are formed between the circumferential groove 3020 and each of the hook-shaped grooves 3200 in the tread width direction Tw.

Shoulder grooves 3280 are formed in a tread shoulder region on an outer side of the land portion 3040 in the tread width direction Tw. The multiple shoulder grooves 3280 are formed at intervals in the tire circumferential direction Tc.

(3.2) Shapes of Circumferential Groove 3020, Land Portion 3030, and Land Portion 3040

Figure 17:
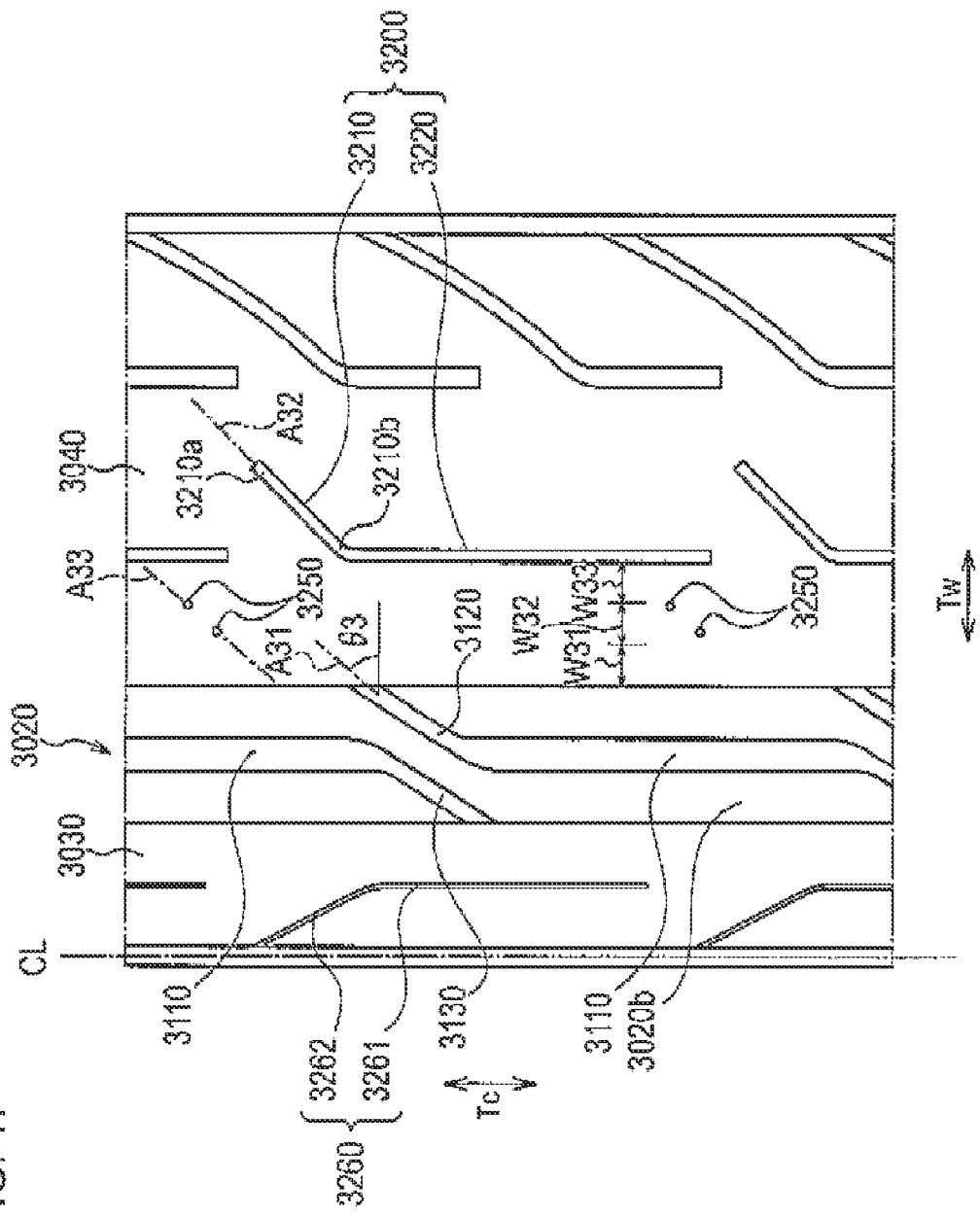
FIG. 17 is a partial development plan view of a circumferential groove 3020 and a land portion 3040 according to the third embodiment of the present invention.
Figure 18:
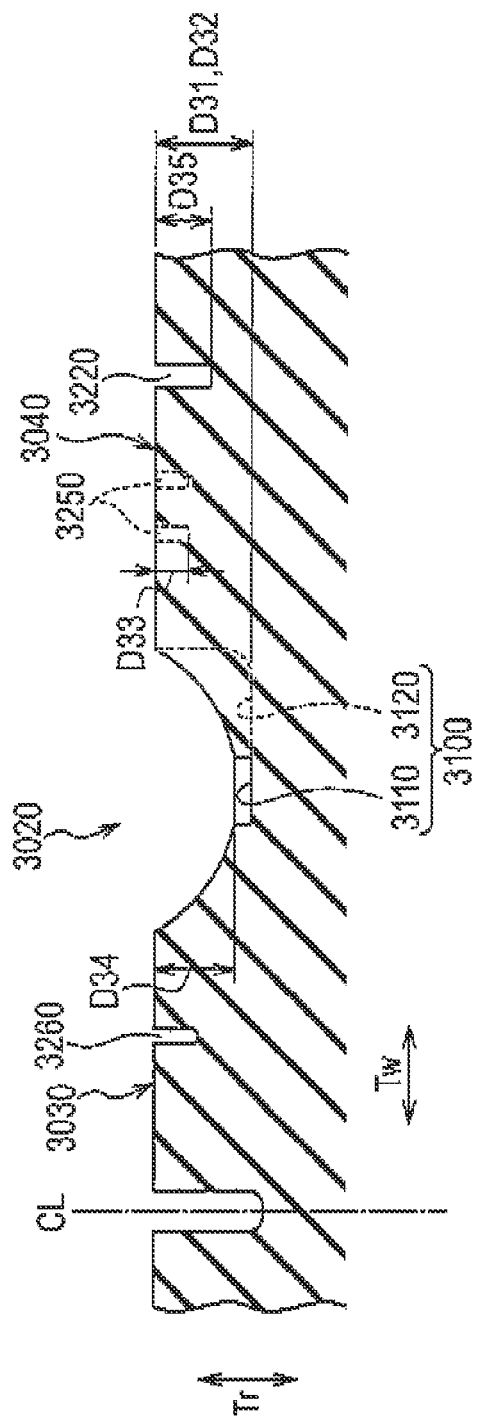
FIG. 18 is a cross-sectional view of the pneumatic tire 3010 taken along the line F34-F34 of FIG. 15 in the tread width direction.

Next, shapes of the circumferential groove 3020, the land portion 3030, and the land portion 3040 are further described with reference to FIGS. 15 to 18. FIG. 17 is a partial development plan view of the circumferential groove 3020 and the land portion 3040. FIG. 18 is a cross-sectional view of the pneumatic tire 3010 taken along the line F34-F34 of FIG. 15 in the tread width direction.

(3.2.1) Circumferential Groove 3020

The circumferential groove 3020 has the same configuration as that of the circumferential groove 1020 of the above-described first embodiment. Hence, description of the circumferential groove 3020 is omitted.

(3.2.2) Land Portion 3030

As shown in FIGS. 15 to 18, the land portion 3030 is located closer to the tire equator line CL than the land portion 3040 is. Each of the circumferential narrow grooves 3260 formed in the land portion 3030 includes a linear groove section 3261 extending in the tire circumferential direction Tc, and a key groove section 3262 inclined relative to the tire equator line CL (see FIG. 17). Note that since circumferential narrow grooves 3270 each have a shape point-symmetric to that of the circumferential narrow groove 3260. Hence, the shape of the circumferential narrow grooves 3260 is described here.

A groove width of each of the circumferential narrow grooves 3260, specifically a width of the circumferential narrow groove 3260 in a transverse direction is smaller than a groove width of each of the in-groove grooves 3100, specifically, a groove width of a linear portion 3110 in a transverse direction.

An end of the circumferential narrow groove 3260, specifically, an end portion of the key groove section 3262 communicates with the narrow groove 3050. On the other hand, another end of the circumferential narrow grooves 3260, specifically an end portion of the linear groove section 3261 is terminated at inside of the land portion 3030.

(3.2.3) Land Portion 3040

The land portion 3040 has the same configuration as that of the land portion 1040 of the above-described first embodiment. Hence, description of the land portion 3040 is omitted.

(3.3) Operations and Effects

According to the pneumatic tire 3010, the multiple circumferential narrow grooves 3260 and 3270 are formed in the land portion 3030 located closer to the tire equator line CL than the land portion 3040 is. This improves the wear resistance of the land portion 3030 which is located in the central region in the tread width direction Tw and which contributes to the drive performance of the pneumatic tire 3010. Specifically, since the formation of the multiple circumferential narrow grooves 3260, 3270 in the land portion 3030 improves the followability (fitness) of the land portion 3030 to a road surface shape, wear of the land portion 3030 by a road surface is reduced. In particular, since the one end of each of the circumferential narrow grooves 3260 (3270) communicates with the narrow groove 3050, the land portion 3030 is sectioned moderately. Hence, the followability of the land portion 3030 to a road surface shape is further improved. Consequently, the drive performance of the pneumatic tire 3010 can be retained for a long period.

In sum, the pneumatic tire 3010 makes it possible to further reduce the pattern noise and the road noise, while the water evacuation performance, the braking performance, and the drive performance are ensured.

(3.4) Modifications of Third Embodiment

Figure 19:
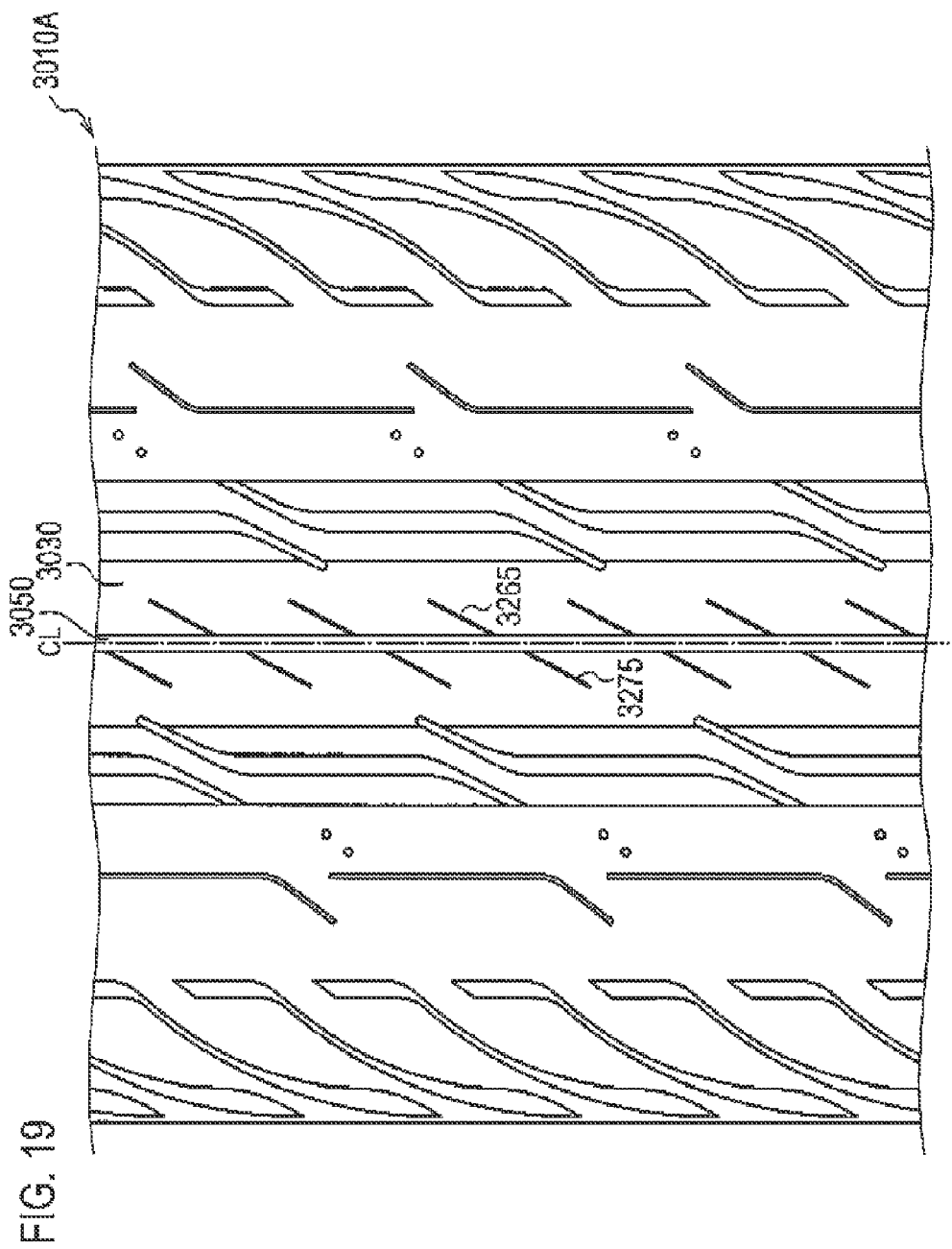
FIG. 19 is a view showing a shape of a land portion 3030 of a pneumatic tire 3010A according to a modification of the third embodiment of the present invention.

For example, the third embodiment of the present invention can be modified as follows. FIG. 19 is a partial development of a tread portion of a pneumatic tire according to a modification of the third embodiment of the present invention. Note that shapes other than that of the land portion 3030 are the same as those in the above-described pneumatic tire 3010.

In a pneumatic tire 3010A shown in FIG. 19, linear narrow grooves 3265 and linear narrow grooves 3275 are formed in the land portion 3030. One end of each of the linear narrow grooves 3265 and one end of each of the linear narrow grooves 3275 communicate with the narrow groove 3050.

Note that the linear narrow grooves 3265 and the linear narrow grooves 3275 are inclined relative to the tire circumferential direction Tc. Here, it is only necessary that the inclination angles thereof relative to the tire circumferential direction Tc (the tire equator line CL) be 45 degrees or smaller.

In the pneumatic tire 3010A according to this modification, the land portion 3030 is more moderately sectioned than in the pneumatic tire 3010 according to the above-described third embodiment. Hence, the wear of the land portion 3030, i.e., a tread center region of the pneumatic tire 3010A is further suppressed.

Moreover, in the above-described pneumatic tires 3010 and 3010A, the land portion 3030 (the second land portion) is provided at the position including the tire equator line CL. However, the land portion 3030 does not necessarily need to be provided at the position including the tire equator line CL, but only needs to be provided at a position other than the tread shoulder portion.

[Fourth Embodiment]

With the recent advent of electric vehicles and hybrid vehicles using an internal combustion engine and an electric motor in combination, reduction of noises generated by a pneumatic tire (hereinafter referred to as tire) has been further strongly required. Moreover, even for automobiles equipped with an internal combustion engine, the reduction of noises generated by a tire has been more strongly required than before, because noises generated by the automobiles themselves are reduced.

Major noises generated by a tire include a pattern noise (pitch noise) attributable to a tread pattern and a road noise attributable to unevenness on a road surface. As a method having a high degree of contribution to the reduction of, particularly, the pitch noise among these noises, a pitch variation has been widely used in which the pitch of the land portion is varied in the tire circumferential direction (for example, Japanese Patent Application Publication No. 2007-168572 (Page 6, FIG. 1)).

Conceivable methods for reducing the pitch noise other than the above-described method in which a pitch variation is provided include a method in which the number of lateral grooves (for example, lug grooves) extending in the tread width direction is reduced, and a method in which the lengths of the lateral grooves are reduced. However, simple reduction in number or total length of the lateral grooves may disturb the balance in rigidity between the longitudinal direction (the tire circumferential direction) and the transverse direction (the tread width direction) of a pneumatic tire.

In general, the disturbance of the balance in rigidity between the longitudinal direction and the transverse direction is not preferable, because the disturbance may cause change in a driving stability of the pneumatic tire. In addition, the reduction in number or length of the lateral grooves leads to reduction in so-called edge constituents, and hence may cause deterioration in braking performance of the pneumatic tire. Furthermore, the reduction in number or length of lateral grooves causes deterioration in water evacuation performance of the pneumatic tire.

To solve the above-described problem, the inventors of the present application have obtained the following findings. Specifically, a new pneumatic tire has lateral grooves having sufficient depths and a land portion having a sufficient height in the tire radial direction. Hence, the land portion sectioned by the lateral grooves tends to collapse in the tire circumferential direction at the braking of an automobile to which the pneumatic tire is attached. Consequently, the braking performance deteriorates. In other words, in a period from a new tire to progression of a certain amount of wear, the braking performance can be improved by reducing the edge constituents attributable to lateral grooves and thereby suppressing the collapse of the land portion, because the land portion is more reliably in contact with the road surface at the time of braking.

On the other hand, after the progression of a certain amount of wear, the collapse of the land portion causes the deterioration in braking performance to an extremely small extent any more. For this reason, it is preferable to improve the braking performance by increasing the edge constituents attributable to the lateral grooves.

This embodiment has been made in view of such a circumstance, and is a tire with which the pattern noise (pitch noise) is further reduced, while the water evacuation performance and the braking performance are ensured. Hereinafter, this embodiment, i.e., the fourth embodiment is described. Portions the same as those in any of the above-described embodiments are omitted as appropriate.

(4.1) General Overall Configuration of Tire

Figure 20:
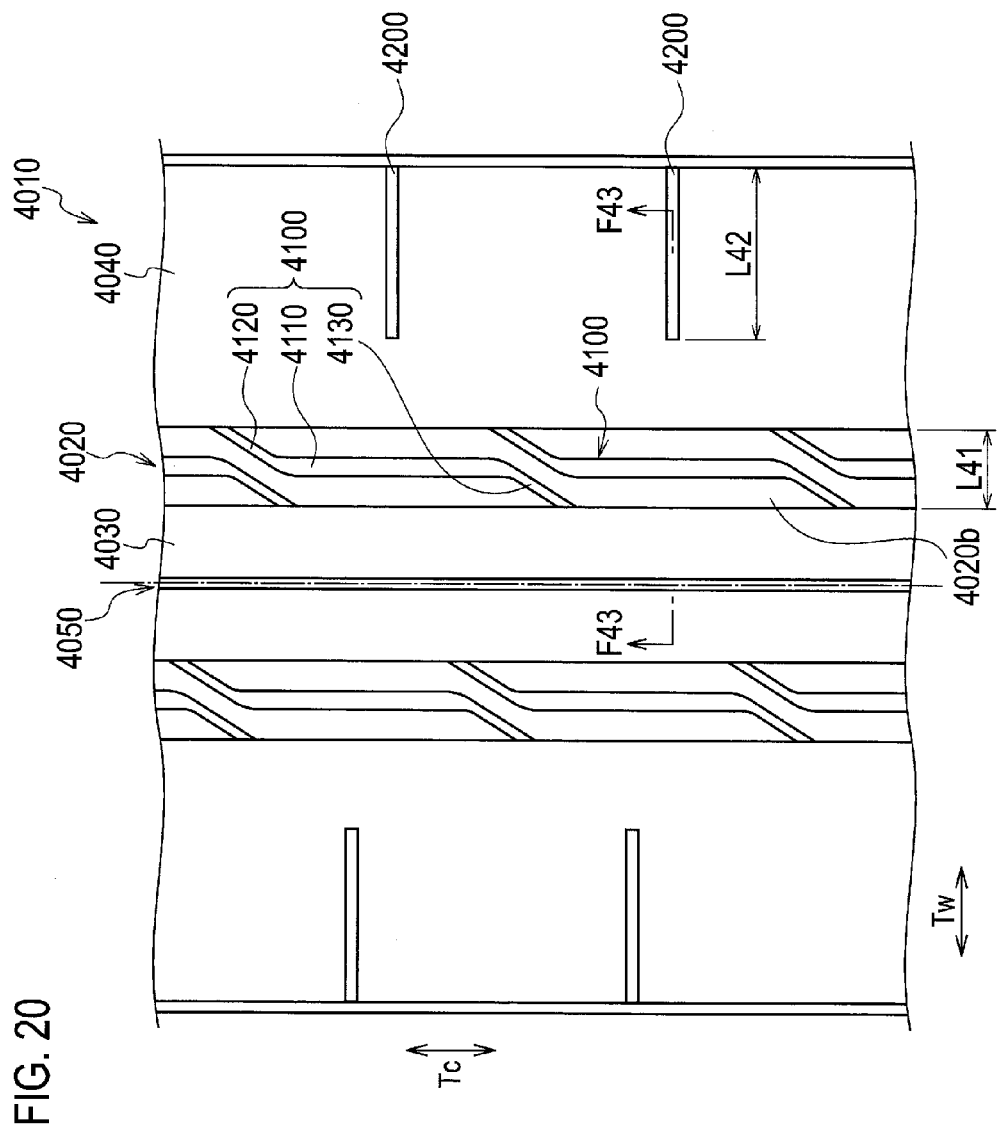
FIG. 20 is a partial development of a tread portion of a pneumatic tire 4010 according to a fourth embodiment of the present invention.
Figure 21:
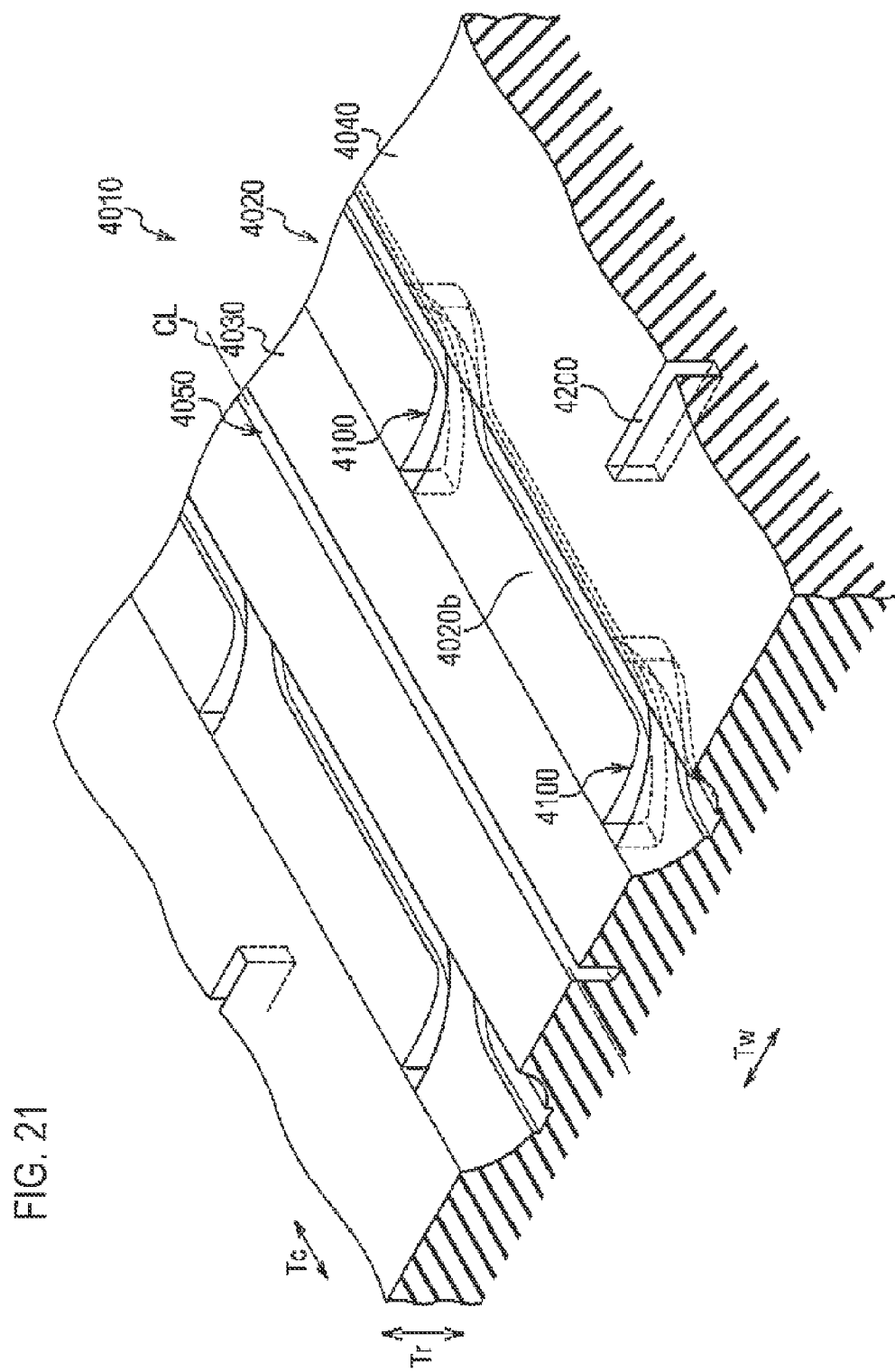
FIG. 21 is a partial perspective view of the tread portion of the pneumatic tire 4010 according to the fourth embodiment of the present invention.

FIG. 20 is a partial development of a tread portion of a pneumatic tire 4010 according to this embodiment. FIG. 21 is a partial perspective view of the tread portion of the pneumatic tire 4010. The pneumatic tire 4010 is a pneumatic tire mainly mounted on passenger cars. Note that the pneumatic tire 4010 mounted on a rim wheel (unillustrated) may be filled not with the air, but with an inert gas such as nitrogen gas.

Moreover, the pneumatic tire 4010 has a point symmetric pattern with respect to the tire equator line CL. Hence, only a tread pattern on one side with respect to the tire equator line CL is described with reference FIGS. 20 and 21.

A circumferential groove 4020 extending in the tire circumferential direction Tc is formed in the pneumatic tire 4010. The circumferential groove 4020 is a groove having a linear shape in a tread surface view. A land portion 4030 is provided inside the circumferential groove 4020 in the tread width direction Tw.

The land portion 4030 is adjacent to the circumferential groove 4020, and extends in the tire circumferential direction Tc. The land portion 4030 is located inside the circumferential groove 4020 in the tread width direction Tw, specifically, between the circumferential groove 4020 and the narrow groove 4050. The narrow groove 4050 has a linear shape extending in the tire circumferential direction Tc, and is formed at a position including the tire equator line CL.

On the other hand, a land portion 4040 is provided outside the circumferential groove 4020 in the tread width direction Tw. The land portion 4040 is adjacent to the circumferential groove 4020, and extends in the tire circumferential direction Tc. The land portion 4040 is located outside the circumferential groove 4020 in the tread width direction Tw.

In-groove grooves 4100 are formed at a groove bottom 4020b of the circumferential groove 4020. Specifically, the in-groove grooves 4100 are further recessed from the groove bottom 4020b inwardly in the tire radial direction Tr.

In addition, lateral grooves 4200 are formed in the land portion 4040. The lateral grooves 4200 are each a groove having a linear shape extending in the tread width direction Tw. A groove width of each of the lateral grooves 4200 is smaller than a groove width of the circumferential groove 4020.

(2) Shapes of Circumferential Groove 4020 and Lateral Grooves 4200

Figure 22:
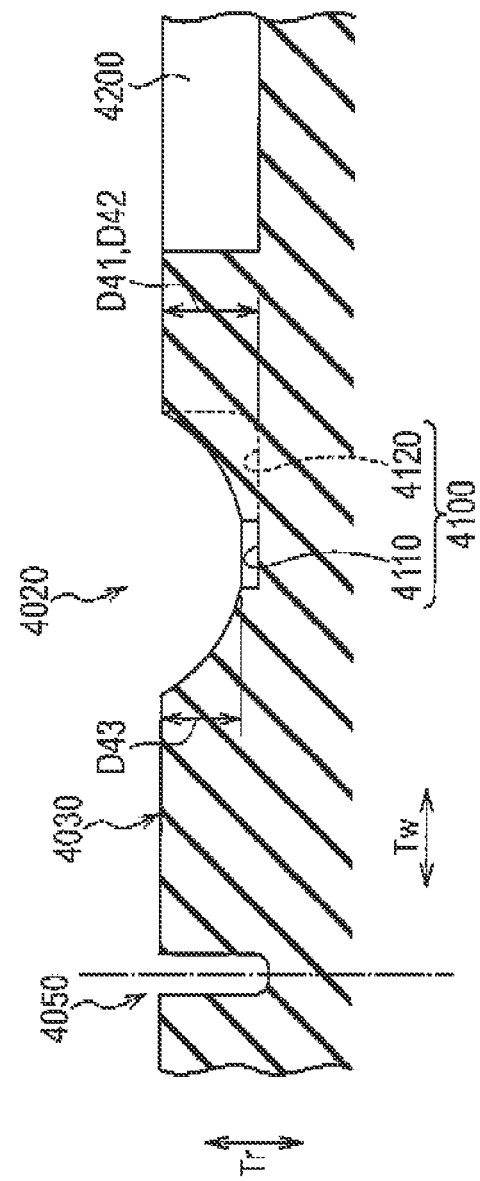
FIG. 22 is a cross-sectional view of the pneumatic tire 4010 taken along the line F43-F43 of FIG. 20 in the tread width direction.

Next, shapes of the circumferential groove 4020 and the lateral grooves 4200 are described with reference to FIGS. 20 to 22. FIG. 22 is a cross-sectional view of the pneumatic tire 4010 taken along the line F43-F43 of FIG. 20 in the tread width direction.

(4.2.1) Circumferential Groove 4020

Each of the in-groove grooves 4100 formed at the groove bottom 4020b of the circumferential groove 4020 includes a linear portion 4110, an inclined portion 4120, and an inclined portion 4130. The linear portion 4110 is formed approximately at a center of the in-groove groove 4100 in the tread width direction Tw. The linear portion 4110 is a groove having a linear shape extending in the tire circumferential direction Tc.

End portions of the linear portion 4110 in the tire circumferential direction Tc communicate with the inclined portion 4120 and the inclined portion 4130, respectively. The inclined portion 4120 and the inclined portion 4130 have shapes symmetric to each other. A maximum groove depth (D41) of the linear portion 4110 from the tread surface is equal to a maximum groove depth (D42) of the inclined portion 4120 (the inclined portion 4130) from the tread surface.

The groove bottom 4020b has an arc shape in a cross-sectional view (see FIG. 22) taken in the tread width direction Tw and the tire radial direction Tr. In other words, the groove depth of the groove bottom 4020b decreases toward the land portion 4030. Likewise, the groove depth of the groove bottom 4020b decreases toward the land portion 4040.

In addition, since a groove depth (D42) of the inclined portion 4120 (the inclined portion 4130) is approximately constant in the tread width direction Tw, a step between the groove bottom 4020b and the inclined portion 4120 (the inclined portion 4130) gets larger toward the land portion 4040 (the land portion 4030).

(4.2.2) Lateral Grooves 4200

As described above, the lateral grooves 4200 are formed in the land portion 4040. Specifically, an outer end of each of the lateral grooves 4200 in the tread width direction extends to a tire shoulder end. Moreover, the lateral grooves 4200 are formed at positions corresponding to positions of the linear portions 4110 of the in-groove grooves 4100 in the tire circumferential direction Tc.

(4.2.3) Relationship between Circumferential Groove 4020 and Lateral Grooves 4200

Next, a relationship between the circumferential groove 4020 and the lateral grooves 4200 is described. The circumferential groove 4020 and the lateral grooves 4200 have the following relationship in terms of the groove volume and the total value of lengths in the tread width direction Tw.

First, in a contact patch of the pneumatic tire 4010 placed in a state where the pneumatic tire 4010 is set at a standard inner pressure specified under the JATMA or the like, and a standard load is applied to the tire, a circumferential groove volume V1 which is a volume defined between the circumferential groove 4020 and a road surface (unillustrated) is greater than a lateral groove volume V2 which is a volume defined between the lateral grooves 4200 and the road surface. Note that the length of the partial development of the tread portion of the pneumatic tire 4010 shown in FIG. 20 is equivalent to a length in the tire circumferential direction Tc of the contact patch of the pneumatic tire 4010 in the state where the standard load is applied to the pneumatic tire 4010. Note that, as a matter of course, the standard inner pressure and the standard load may vary depending on the size of the pneumatic tire 4010, the type of a vehicle to which the pneumatic tire 4010 is attached, and the like. Hence, the circumferential groove volume V1 and the lateral groove volume V2 may vary depending on the size of the pneumatic tire 4010, the type of a vehicle to which the pneumatic tire 4010 is attached, and the like.

Moreover, in the contact patch of the pneumatic tire 4010, a total value of lengths L41 of the in-groove grooves 4100 in the tread width direction Tw is equal to or greater than a total value of lengths L42 (lateral groove lengths) of the lateral grooves 4200 in the tread width direction Tw. Here, the total value of the lengths L41 is a total length of lengths in the tread width direction Tw of all in-groove grooves 4100 located in the contact patch of the pneumatic tire 4010. For example, assuming that the development of the tread portion shown in FIG. 20 is equivalent to the contact patch, regions of in-groove grooves 4100 equivalent to three in-groove grooves 4100 are located in the contact patch, and hence the total value is 3×L41 (in a case of a half side with respect to the tire equator line CL). On the other hand, two lateral grooves 4200 are located in the contact patch, and hence the total value is 2×L42.

Note that, as shown in FIG. 20, an angle θ41 formed by the circumferential groove 4020 and the tire equator line CL in a tread surface view is preferably 45 degrees or smaller. Moreover, an angle θ42 formed by each of the lateral grooves 4200 and a straight line SL perpendicular to the tire equator line CL in a tread surface view is preferably smaller than 45 degrees.

(4.3) Operations and Effects

According to the pneumatic tire 4010, the circumferential groove volume V1 is greater than the lateral groove volume V2. Hence, the water evacuation performance can easily be ensured.

Moreover, the in-groove grooves 4100 are formed in the circumferential groove 4020, and the total value of the lengths L41 of the in-groove grooves 4100 in the tread width direction Tw is equal to or greater than the total value of the lengths L42 of the lateral grooves 4200 in the tread width direction Tw, in the contact patch of the pneumatic tire 4010. Hence, after progression of a certain amount of wear in the pneumatic tire 4010, the edge constituents attributable to the in-groove grooves 4100 are in contact with the road surface. In other words, after progression of a certain amount of wear in the pneumatic tire 4010, the braking performance is retained by the edge constituents attributable to the in-groove grooves 4100.

Moreover, the in-groove grooves 4100 are formed in the circumferential groove 4020. Hence, even when the number or total length of the lateral grooves 4200 is reduced, the balance in rigidity of the pneumatic tire 4010 is not disturbed greatly.

In sum, the pneumatic tire 4010 makes it possible to further reduce the pattern noise (pitch noise), while the water evacuation performance and the braking performance are ensured.

(4.4) Modifications of Fourth Embodiment

For example, the shapes of the in-groove grooves 4100 and the lateral grooves 4200 are not limited to those in the above-described embodiment. For example, the shape of the in-groove grooves 4100 may be a linear shape formed with an inclination relative to the tire equator line CL, and the shape of the lateral grooves 4200 is not limited to a linear shape, but may be an arc shape or a zigzag shape.

[Fifth Embodiment]

Conventionally, to ensure water evacuation performance on a wet road surface, a method in which multiple circumferential grooves are formed in a tread has been widely used for a pneumatic tire (hereinafter referred to as tire) mounted on a passenger car or the like.

For example, a tire is known in which, for active evacuation of rainwater entering the circumferential grooves, protrusions inclined relative to center lines of circumferential grooves in a tread are provided in groove bottom portions of the circumferential grooves (for example, Japanese Patent Application Publication No. 2005-170381 (Page 3, FIG. 2)). With such a tire, flows of rainwater entering the circumferential grooves are created, so that the water evacuation performance is improved.

However, the above-described conventional tire has the following problems. Specifically, the tire provided with the protrusions in the groove bottom portions has such a problem that buckling tends to occur in which the tread warps back inwardly in the tire radial direction in the vicinities of the circumferential grooves, the buckling starting from the protrusions. When the buckling occurs, a ground contact shape of the tread is destabilized, so that the braking performance deteriorates.

On the other hand, for reduction of occurrence of the buckling in the vicinities of the circumferential grooves, it is conceivable that groove bottom portions of the circumferential grooves or wall surfaces of land portions forming the circumferential grooves are reinforced. In this case, another problem is caused in which the cross-sectional areas (volumes) of the circumferential grooves are reduced, so that the water evacuation performance deteriorates. Moreover, when the tread pattern is changed by the reinforcement of the wall surfaces of the land portions or the like, the pitch noise may increases, in particular, after wear.

In this respect, this embodiment is a tire in which circumferential grooves are formed in a tread, and with which deterioration in braking performance caused by buckling is reduced, while the water evacuation performance is ensured and the reduction in pitch noise is achieved. Hereinafter, this embodiment, i.e., the fifth embodiment is described. Portions the same as those in any of the above-described embodiments are omitted as appropriate. Note that, in the following description, "auxiliary grooves" have the same configuration as that of the above-described "hook-shaped grooves," "circumferential groove sections" have the same configuration as that of the above-described "linear groove sections," "width-direction groove sections" have the same configuration as that of the above-described "hook groove sections," "fine holes" have the same configuration as that of the above-described "pinhole sipes," "high-angle groove sections" have the same configuration as that of the above-described "linear portions," and "low-angle groove sections" have the same configuration as that of the above-described "inclined portions."

(5.1) Overall Configuration of Pneumatic Tire

Figure 23:
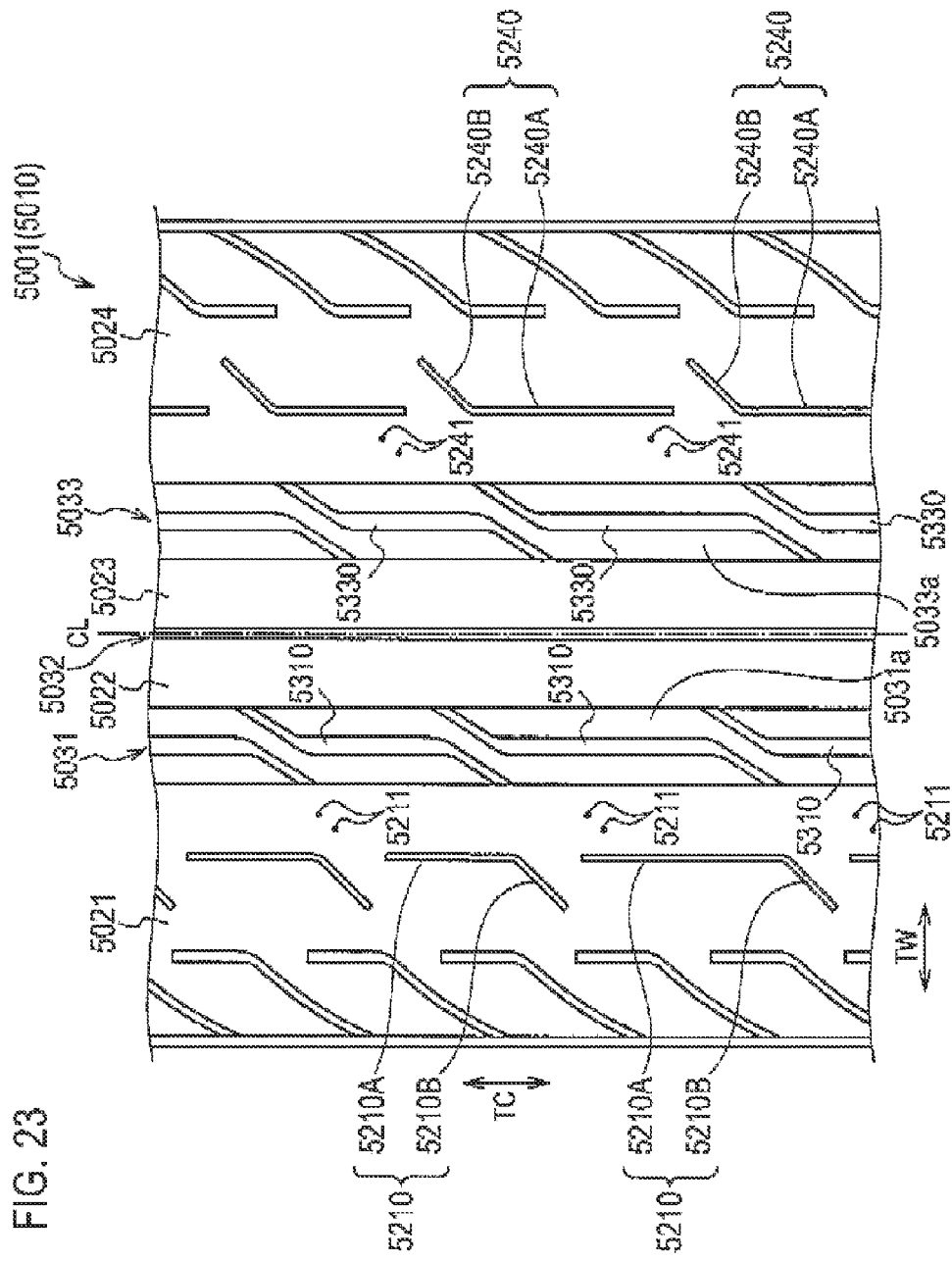
Figure 24:
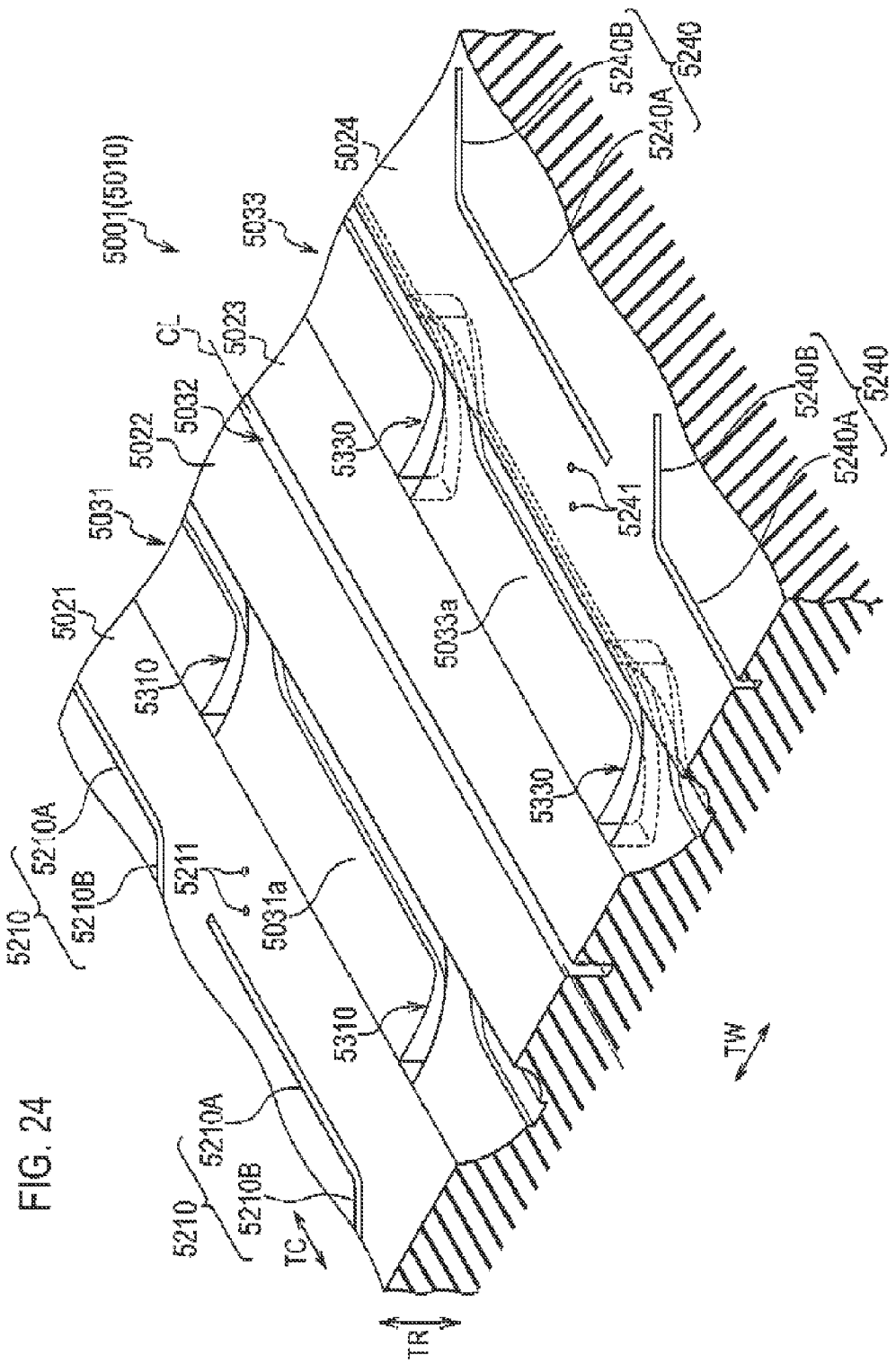
FIG. 24 is a perspective view showing a part of the tread surface 5010 of the pneumatic tire 5001 according to the fifth embodiment of the present invention.

First, an overall configuration of a pneumatic tire 5001 according to this embodiment is described with reference to the drawings. FIG. 23 is a development showing a part of a tread surface 5010 of the pneumatic tire 5001 according to this embodiment. FIG. 24 is a perspective view showing a part of the tread surface 5010 of the pneumatic tire 5001 according to this embodiment. Note that the pneumatic tire 5001 may be filled not with the air, but with an inert gas such as nitrogen gas.

As shown in FIGS. 23 and 24, a tread pattern formed on the tread surface 5010 of the pneumatic tire 5001 is point-symmetric with respect to a tire equator line CL passing through a center of the pneumatic tire 5001. The pneumatic tire 5001 includes multiple rib-shaped land portions extending in the tire circumferential direction Tc. Moreover, circumferential grooves being located between the land portions and extending in the tire circumferential direction Tc are formed on the tread surface 5010 of the pneumatic tire 5001.

Specifically, the land portions include a land portion 5021, a land portion 5022, a land portion 5023, and a land portion 5024, from the left to the right in FIG. 23. The land portion 5021 constitutes an outer land portion located outside a circumferential groove 5031 to be described later in the tread width direction Tw. At least multiple auxiliary grooves 5210 and multiple fine holes 5211 (pin sipes) are formed in the land portion 5021. Note that the configuration of the fine holes 5211 is to be described later.

Each of the auxiliary grooves 5210 includes a circumferential groove section 5210A extending in the tire circumferential direction Tc and a width-direction groove section 5210B extending in the tread width direction Tw. The circumferential groove section 5210A is located closer to the tire equator line CL (a circumferential groove 5031 to be described later) than the width-direction groove section 5210B is. The width-direction groove section 5210B extends from one end (a lower end portion in the drawing) of the circumferential groove section 5210A outwardly in the tread width direction Tw.

The land portion 5022 and the land portion 5023 extend in the tire circumferential direction. Neither grooves nor recessed portions are formed in any of the land portion 5022 and the land portion 5023. The land portion 5022 and the land portion 5023 are located inside circumferential grooves 5031 and 503 to be described later in the tread width direction Tw.

The land portion 5024 constitutes an outer land portion located outside the circumferential groove 5033 to be described later in the tread width direction Tw. At least multiple auxiliary grooves 5240 and multiple fine holes 5241 (pin sipes) are formed in the land portion 5024, as in the case of the land portion 5021. Note that the configuration of the fine holes 5241 is described later.

Each of the auxiliary grooves 5240 includes a circumferential groove section 5210A extending in the tire circumferential direction Tc and a width-direction groove section 5240B extending in the tread width direction Tw. The circumferential groove section 5210A is located closer to the tire equator line CL (the circumferential groove 5033 to be described later) than the width-direction groove section 5240B is. The width-direction groove section 5240B extends from one end (an upper end portion in the drawing) of the circumferential groove section 5210A outwardly in the tread width direction Tw.

The circumferential grooves include the circumferential groove 5031, a circumferential groove 5032, and the circumferential groove 5033, from the left to the right in FIG. 23. The shape of each of the circumferential grooves 5031 and 5033 is a half-moon shape recessed in the tire radial direction Tr in a cross-section taken along the line A-A (see FIGS. 24 and 26). Note that the configurations of the circumferential grooves 6031 and 5033 are described later.

On the other hand, the circumferential groove 5032 is located on the tire equator line CL, and is formed to be narrower than the circumferential grooves 5031 and 5033. The shape of the circumferential groove 5032 is a quadrangular shape recessed in the tire radial direction Tr in a cross-section taken along the line A-A (see FIGS. 24 and 26).

(5.2) Configuration of Circumferential Grooves

Figure 25:
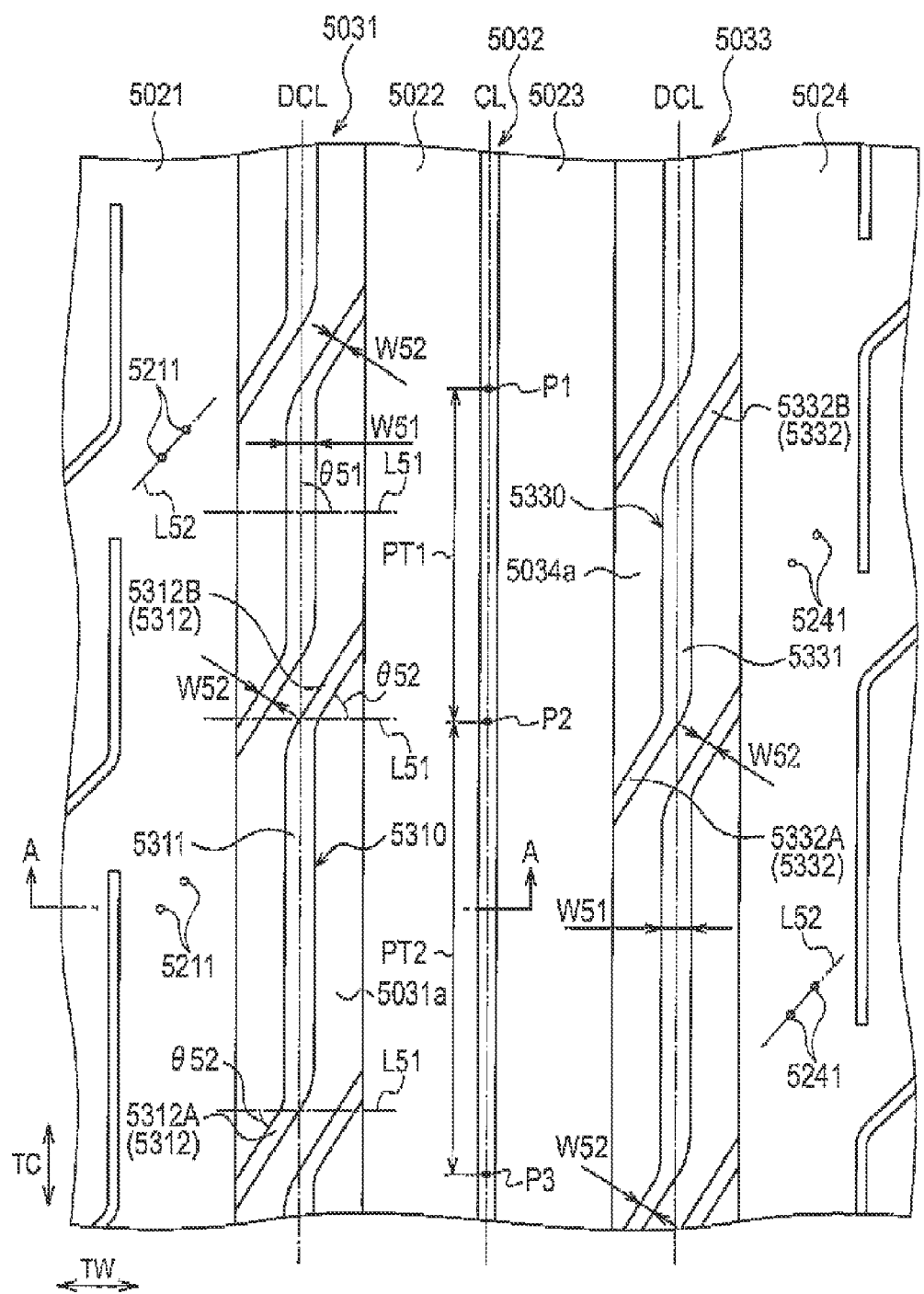
FIG. 25 is an enlarged plan view showing a vicinity of circumferential grooves 5031 and 5033 according to the fifth embodiment of the present invention.
Figure 26:
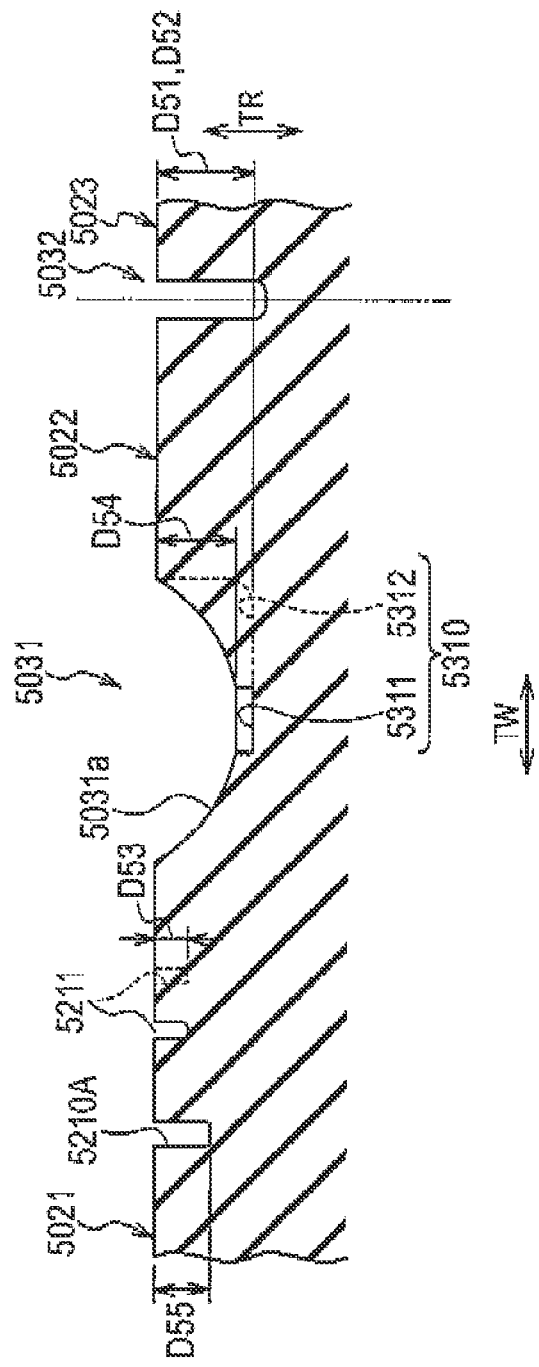
FIG. 26 is a cross-sectional view (a cross-sectional view taken along A-A of FIG. 25) showing a part of the circumferential groove 5031 according to the fifth embodiment of the present invention.

Next, the configurations of the above-described circumferential grooves 5031 and 5033 are described with reference to FIGS. 23 to 26. FIG. 25 is an enlarged plan view showing a vicinity of the circumferential grooves 5031 and 5033 according to this embodiment. FIG. 26 is a cross-sectional view (a cross-sectional view taken along the line A-A of FIG. 25) showing a part of the circumferential groove 5031 according to this embodiment. Note that since the configuration of the circumferential groove 5031 is the same as that of the circumferential groove 5033. FIG. 26 shows only the configuration of the circumferential groove 5031.

As shown in FIGS. 23 to 26, in-groove grooves 5310 recessed from the circumferential groove 5031 inwardly in the tire radial direction Tr are formed in the circumferential groove 5031. Upper ends of the in-groove grooves 5310 are defined by a groove bottom 5031a of the circumferential groove 5031. Each of the in-groove grooves 5310 is provided in a crank shape (an S-shape) in a tread surface view. Specifically, the in-groove groove 5310 includes a high-angle groove section 5311 and low-angle groove sections 5312.

As shown in FIG. 25, the high-angle groove section 5311 linearly extends in the tire circumferential direction Tc, and is continuous to the low-angle groove sections 5312. In the high-angle groove section 5311, an angle $\theta 51$ formed by the in-groove groove 5310 and a straight line L51 perpendicular to the tire equator line CL is not smaller than a predetermined angle (for example, 45 degrees). In this embodiment, the angle $\theta 51$ of the high-angle groove section 5311 is 90 degrees.

The high-angle groove section 5311 is located closer to an in-groove center line DCL passing through a center of the circumferential groove 5031 in the tread width direction Tw than the low-angle groove sections 5312 are. In this embodiment, the high-angle groove section 5311 is located on the in-groove center line DCL.

Moreover, a width W51 of the high-angle groove section 5311 in a direction perpendicular to the extending direction thereof (the tire circumferential direction Tc), i.e., the width in the tread width direction Tw is approximately constant. The width W51 of the high-angle groove section 5311 is greater than a width W52 of each of the low-angle groove sections 5312 to be described later in the extending direction thereof.

The low-angle groove sections 5312 extend in the tread width direction Tw, and are continuous to land portions (the land portions 5021 or the land portions 5022). In each of the low-angle groove sections 5312, an angle $\theta 52$ formed by the straight line L51 and the in-groove groove 5310 is smaller than a predetermined angle. In this embodiment, the angle $\theta 52$ of the low-angle groove section 5312 is 40 degrees.

Each of the low-angle groove sections 5312 is located closer to the land portion than the high-angle groove section 5311 is. The low-angle groove sections 5312 are provided on both ends of the high-angle groove section 5311, respectively.

Specifically, the low-angle groove sections 5312 include a first groove section 5312A provided on one end (an lower end portion in the drawing) of the high-angle groove section 5311 and a second groove section 5312B provided on the other end (an upper end portion in the drawing) of the high-angle groove section 5311. The first groove section 5312A is continuous to the land portion 5021, while the second groove section 5312B is continuous to the land portion 5022. The first groove section 5312A and the second groove section 5312B are provided in parallel with each other.

Here, as shown in FIG. 26, a depth D51 from the tread surface 5010 of the pneumatic tire 5001 to the groove bottom of the high-angle groove section 5311 in the tire radial direction Tr is approximately equal to a depth D52 from the tread surface 5010 of the pneumatic tire 5001 to the groove bottom of each of the low-angle groove sections 5312 in the tire radial direction Tr.

On the other hand, in-groove grooves 5330 recessed from the circumferential groove 5033 inwardly in the tire radial direction Tr are formed in the circumferential groove 5033. Upper ends of the in-groove grooves 5330 are defined by a groove bottom 5033a of the circumferential groove 5033. Note that since the in-groove grooves 5330 have approximately the same configuration as that of the above-described in-groove grooves 5310, different portions are mainly described.

Each of the in-groove grooves 5330 includes a high-angle groove section 5331 and low-angle groove sections 5332. The low-angle groove sections 5332 includes a first groove section 5332A provided on one end (a lower end portion in the drawing) of the high-angle groove section 5331 and a second groove section 5332B provided on the other end (an upper end portion in the drawing) of the high-angle groove section 5331. The first groove section 5332A is continuous to the land portion 5023, while the second groove section 5332B is continuous to the land portion 5024.

The in-groove grooves 5310 and 5330 as described above are provided to be point-symmetric with respect to center points P1, P2, and P3 located on the tire equator line CL (see FIG. 25).

Moreover, in this embodiment, a pitch PT1 and a pitch PT2 are different from each other, where each of the pitch PT1 and the pitch PT2 is a length in the tire circumferential direction Tc from a position at which the tread surface 5010 of the pneumatic tire 5001 has a predetermined shape to a position at which the predetermined shape appears again in the tire circumferential direction Tc. In the pneumatic tire 5001, the pitch PT1 and the pitch PT2 are randomly repeated in the tire circumferential direction Tc.

The pitch PT1 is set to a length of 0.8, where the length of the pitch PT2 is regarded as 1.0. In other words, the length of the high-angle groove section 5311 (5331) is smaller in a region with the pitch PT1 than in a region with the pitch PT2.

(5.3) Configurations of Fine Holes

Next, configurations of the above-described fine holes 5211 and 5241 are described with reference to FIGS. 23 to 26. As shown in FIGS. 23 to 25, each pair of the fine holes 5211 or 5241 are aligned on a straight line L52 in parallel with the extending direction of the low-angle groove sections 5312 and 5332 (see FIG. 25). The fine holes 5211 and 5241 are each formed to have a circular shape in a tread surface view.

As shown in FIG. 26, each of the fine holes 5211 and 5241 is recessed from a tread surface 5010A inwardly in the tire radial direction Tr. A depth D53 of the fine holes 5211 and 5241 in the tire radial direction Tr is smaller than a depth D54 of the circumferential groove in the tire radial direction Tr. Moreover, the depth D53 of the fine holes 5211 and 5241 is still smaller than a depth D55 of the auxiliary grooves 5210 and 5240 in the tire radial direction Tr.

The fine holes 5211 are provided on one end (an upper end portion in the drawing) side of each of the circumferential groove sections 5210A, i.e., on an end side of the circumferential groove section 5210A other than the side on which the width-direction groove section 5210B is continuous to the circumferential groove section 5210A. Specifically, the fine holes 5211 are located between each pair of the low-angle groove sections 5312 adjacent to each other in the tire circumferential direction Tc. In other words, the fine holes 5211 are located between each pair of the first groove sections 5312A adjacent to each other in the tire circumferential direction Tc.

On the other hand, the fine holes 5241 are provided on one end (a lower end portion in the drawing) side of each of the circumferential groove sections 5210A, i.e., on an end side of the circumferential groove section 5210A other than the side on which the width-direction groove section 5240B is continuous to the circumferential groove section 5210A. Specifically, the fine holes 5241 are located between each pair of the low-angle groove sections 5332 adjacent to each other in the tire circumferential direction Tc. In other words, the fine holes 5241 are located between each pair of the second groove sections 5332B adjacent to each other in the tire circumferential direction Tc.

(5.4) Modification

Next, a modification of the tread surface 5010 of the pneumatic tire 5001 according to the above-described fifth embodiment is described with reference to the drawings. Note that the same portions as those in the tread surface 5010 of the pneumatic tire 5001 according to the above-described fifth embodiment are denoted by the same reference signs, and different portions are mainly described.

Figure 27:
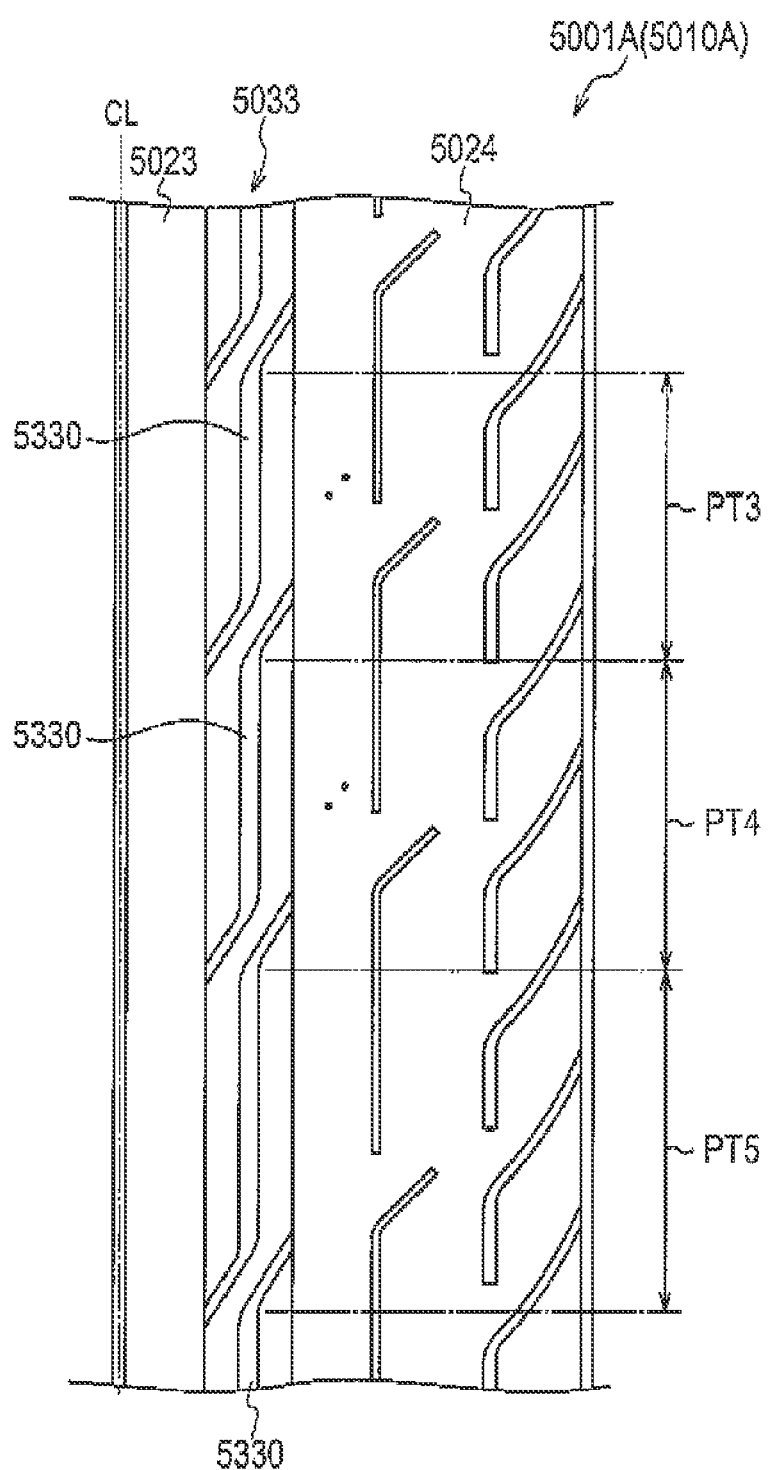
FIG. 27 is a development showing a part of a tread surface 5010A of a pneumatic tire 5001A according to a modification of the fifth embodiment of the present invention.

FIG. 27 is a development showing a part of a tread surface 5010A of a pneumatic tire 5001A according to the modification of the fifth embodiment of the present invention. As shown in FIG. 27, three kinds of pitches, namely, a pitch PT3, a pitch PT4, and a pitch PT5 are set in the pneumatic tire 5001A. In the pneumatic tire 5001A, the pitch PT3, the pitch PT4, and the pitch PT5 are randomly repeated in the tire circumferential direction Tc.

The pitch PT3 is set to a length of 0.9, where the length of the pitch PT4 is regarded as 1.0. Meanwhile, the pitch PT5 is set to a length of 1.1, where the length of the pitch PT4 is regarded as 1.0.

Note that three kinds of pitches are set in the pneumatic tire 5001A, and an upper limit of the number of kinds of the pitches is preferably five for a reason associated with production costs of the pneumatic tire.

(5.5) Operations and Effects

In the above-described fifth embodiment, the in-groove grooves 5310 and 5330 including the high-angle groove sections 5311 and 5331 and the low-angle groove sections 5312 and 5332 are formed in the circumferential grooves 5031 and 5033. This increases the cross-sectional areas (volumes) of the circumferential grooves 5031 and 5033, enabling improvement in water evacuation performance, as compared with a case where protrusions are provided in the circumferential grooves 5031 and 5033.

Moreover, the angle θ51 formed by the straight line L51 and the in-groove groove 5310 or 5330 is not smaller than a predetermined angle in each of the high-angle groove sections 5311 and 5331. Moreover, the high-angle groove sections 5311 and 5331 are located closer to the in-groove center line DCL than the low-angle groove sections 5312 and 5332 are. Consequently, the high-angle groove sections 5311 and 5331 are formed to be more parallel with the tire circumferential direction Tc than the low-angle groove sections 5312 and 5332 are. Hence, the flows of rainwater entering the high-angle groove sections 5311 and 5331 are less likely to be disturbed, so that the water evacuation performance is reliably improved.

Moreover, since two or more kinds of the pitches (for example, the pitches PT1 and PT2) are provided in the tire circumferential direction Tc, increase of noises having certain frequencies is prevented, so that the pitch noise is reduced.

In particular, the width W51 of the high-angle groove sections 5311 and 5331 is greater than the width W52 of the low-angle groove sections 5312 and 5332. Hence, the cross-sectional areas (volumes) of the circumferential grooves 5031 and 5033 increase, which facilitates the creation of flows of rainwater entering the high-angle groove sections 5311 and 5331 in the tire circumferential direction Tc, so that the water evacuation performance is more reliably improved.

On the other hand, the angle θ51 formed by the straight line L51 and the in-groove groove 5310 or 5330 is smaller than a predetermined angle in each of the low-angle groove sections 5312 and 5332. In addition, the low-angle groove sections 5312 and 5332 are located closer to the land portions than the high-angle groove sections 5311 and 5331 are. Consequently, the rigidity of the land portions can be more reliably ensured in this case than in a case where the angle θ51 is not smaller than the predetermined angle. For this reason, it is possible to reduce the occurrence of buckling in which the tread warps back inwardly in the tire radial direction Tr in the vicinities of the circumferential grooves 5031 and 5033. Hence, a ground contact shape of the tread is stabilized, so that deterioration in the braking performance and the like can be reduced.

In the fifth embodiment, the high-angle groove sections 5311 and 5331 each extend in the tire circumferential direction Tc. This facilitates the stabilization of the flows of water in the circumferential grooves 5031 and 5033, so that the water evacuation performance is more reliably improved.

Moreover, the low-angle groove sections 5312 and 5332 each extend in the tread width direction Tw. This improves the rigidity of the wall surfaces of the land portions forming the circumferential grooves 5031 and 5033 in the tread width direction Tw, so that the rigidity of the land portions can be more reliably ensured.

In the fifth embodiment, the low-angle groove sections 5312 and 5332 are provided at both ends of the high-angle groove sections 5311 and 5331. This increases an edge effect due to the first groove sections 5312A and the second groove sections 5312B at the time of wear of the tire, so that the braking performance is improved at the time of wear of the tire.

In the fifth embodiment, the low-angle groove sections 5312 and 5332 are continuous to the land portions. This makes it possible to obtain an edge effect by the low-angle groove sections 5312 and 5332 at an initial stage of wear of the tire, so that the braking performance is improved.

In the fifth embodiment, the fine holes 5211 and 5241 are formed in the land portions 5021 and 5024. This makes it possible to obtain an edge effect by the fine holes 5211 and 5241 when the tire is a new one, while deterioration in rigidity of the land portions 5021 and 5024 is suppressed. Hence, the braking performance is reliably improved.

Incidentally, when the fine holes 5211 or 5241 are not formed in the land portion 5021 or 5024, the rigidity of portions between the first groove sections 5312A is increased in the land portion 5021 or 5024, so that the rigidity of the land portion 5021 or 5024 is made non-uniform in the tire circumferential direction Tc in some cases. It is conceivable that this increases the possibility of the generation of noise (so-called the pattern noise) caused by the tread of the pneumatic tire 5001 in contact with the ground.

However, the fine holes 5211 and 5241 are located between each pair of the low-angle groove sections 5312 or 5332 adjacent to each other in the tire circumferential direction Tc. This reduces the possibility of the variation in rigidity of the land portions 5021 and 5024 in the tire circumferential direction Tc, so that generation of the noise caused by the tread of the pneumatic tire 5001 in contact with the ground can be suppressed.

In the fifth embodiment, the shapes of the circumferential grooves 5031 and 5033 are half-moon shapes recessed in the tire radial direction Tr in a cross-section taken along the line A-A. This results in increase in the rigidity of the land portions with the progress of the wear, and enables an edge effect to be gradually exhibited by the low-angle groove sections 5312 and 5332. For this reason, a more stable braking performance can be exhibited for a period from an initial stage of the wear to a certain amount of wear.

(5.6) Other Modifications of Fifth Embodiment

For example, the fifth embodiment of the present invention can be modified as follows. Specifically, although the pneumatic tire 5001 filled with the air, nitrogen gas, or the like is described as the tire, the tire is not limited thereto, but may be a solid tire which is not filed with the air, nitrogen gas, or the like.

Moreover, the pneumatic tire 5001 only needs to be provided with at least the land portions and the circumferential grooves, and, as a matter of course, the tread pattern of the pneumatic tire 5001 can be selected as appropriate depending on the purpose.

Moreover, although the high-angle groove sections 5311 and 5331 and the low-angle groove sections 5312 and 5332 are formed to have linear shapes in the description, the shapes are not limited thereto, but may be, for example, curved shapes.

Moreover, the low-angle groove sections 5312 or 5332 are provided on both ends of each of the high-angle groove sections 5311 and 5331 in the above-description. However, this embodiment is not limited thereto, and the low-angle groove section 5312 or 5332 may be provided on one of the ends or provided at a position other than the end portions (for example, a vicinity of the center).

Moreover, the first groove section 5312A and the second groove section 5312B (the first groove section 5332A and the second groove section 5332B) are continuous to different land portions, respectively, in the above description. However, this embodiment is not limited there to, but the first groove section 5312A and the second groove section 5312B (the first groove section 5332A and the second groove section 5332B) may be continuous to the same land portion. Note that each of the low-angle groove sections 5312 and 5332 does not necessarily need to be continuous to a land portion, but may be terminated at inside of the circumferential groove 5031 or 5033.

Moreover, the depth D51 in the tire radial direction Tr from the tread surface 5010 of the pneumatic tire 5001 to the groove bottom of the high-angle groove section 5311 is approximately equal to the depth D52 in the tire radial direction Tr from the tread surface 5010 of the pneumatic tire 5001 to the groove bottom of each of the low-angle groove sections 5312, in the above description. However, this embodiment is not limited thereto, and, for example, the depth D51 may be greater than the depth D52, in other words, the depth D52 may be smaller than the depth D51, in order to improve the water evacuation performance in the vicinity of the in-groove center line DCL or the rigidity of the land portions.

Moreover, as a matter of course, the configurations (the numbers, shapes, and the like) of the fine holes 5211 and 5241 are not limited to those described in the embodiment, but may be selected as appropriate depending on the purpose. For example, the fine holes 5211 and 5241 are formed to have circular shapes in a tread surface view, in the above description. However, the shapes are not limited thereto, but may be triangular shapes or quadrangular shape (polyangular shapes). Note that the fine holes 5211 and 5241 do not necessarily need to be formed in the land portions 5021 and 5024, and no fine holes 5211 and 5241 may be formed in any of the land portions 5021 and 5024.

[Other Embodiments]

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

For example, sipes or the like may be formed which influence the rigidity of a land portion in which hook-shaped grooves are formed. In other words, sipes or the like may be formed which influence deformation of the land portion, in which the hook-shaped grooves are formed, upon an input thereto.

Here, a description is made with the pneumatic tire 1010 according to the first embodiment taken as an example. For example, a circumferential sipe extending in the tire circumferential direction Tc between the circumferential groove 1020 and the hook-shaped groove 1200 may be formed in the land portion 1030. The circumferential sipe may be formed between the circumferential groove 1020 and the pinhole sipes 1250 close to the circumferential groove 1020 in the tread width direction Tw. The circumferential sipe may be formed between the pinhole sipes 1250 close to the circumferential groove 1020 and the pinhole sipes 1250 distant from the circumferential groove 1020. The circumferential sipe may be formed between the hook-shaped groove 1200 and the pinhole sipes 1250 distant from the circumferential groove 1020. Hence, the land portion 1030 may be sectioned by the circumferential sipe. The other embodiments may also be modified in the same manner.

Note that a sipe herein refers to a narrow groove whose one groove wall and other groove wall can be in contact with each other when a pneumatic tire is in contact with the ground under a predetermined inner pressure and a predetermined load determined under a national standard of JATMA (The Japan Automobile Tyre Manufacturers Association, Inc.), TRA (The Tire and Rim Association Inc.), ETRATO (The European Tire and Rim Technical Organization), or the like. The groove width of a sipe is generally 1.5 mm or less. The groove width of a sipe may be 1.5 mm or more in a tire used for large buses or trucks such as a TBR tire.

Note that an extending direction herein includes not only directions on an extension line, but also directions in parallel with the extending direction. Hence, for example, in the above-described pneumatic tire 1010 according to the first embodiment, the direction A11 and the direction A12 are approximately in parallel with each other, but the direction A12 is not on an extension line of the direction A11.

The features of the above-described embodiments can be combined as appropriate, unless the invention is impaired.

As described above, the present invention naturally includes various embodiments and the like which are not described herein. Accordingly, the technical scope of the present invention should be determined only by the matters to define the invention in CLAIMS regarded as appropriate based on the description.

Note that the entire contents of Japanese Patent Application No. 2010-202296 (filed on Sep. 9, 2010), Japanese Patent Application No. 2010-202299 (filed on Sep. 9, 2010), Japanese Patent Application No. 2010-202166 (filed on Sep. 9, 2010), Japanese Patent Application No. 2011-125643 (filed on Jun. 3, 2011), and Japanese Patent Application No. 2011-125547 (filed on Jun. 8, 2011) are incorporated herein by reference.

INDUSTRIAL APPLICABILITY

The present invention makes it possible to provide a tire with which the pattern noise and the road noise are further reduced, while the water evacuation performance and the braking performance are ensured. Moreover, the present invention makes it possible to provide a tire with which the pattern noise and the road noise are further reduced, while the water evacuation performance, the braking performance, and the drive performance are ensured. Furthermore, the present invention makes it possible to provide a tire in which a circumferential groove is formed in a tread, and with which deterioration in braking performance caused by buckling is reduced, while the water evacuation performance is ensured and the reduction in pitch noise is achieved.

The invention claimed is:

1. A tire comprising:
a circumferential groove extending in a tire circumferential direction, and
a land portion being adjacent to the circumferential groove and extending in the tire circumferential direction, and
an inner land portion located closer to a tire equator line than the land portion,
wherein
in-groove grooves which are recessed from a groove bottom of the circumferential groove inwardly in a tire radial direction are formed in the circumferential groove,
each of the in-groove grooves includes an inclined portion extending with an inclination relative to the tire circumferential direction,
a groove portion extending in an extending direction of the inclined portion is formed in the land portion,
at least one of end portions of the groove portion in the extending direction is terminated at inside of the land portion,
a circumferential narrow groove extending in the tire circumferential direction is formed in the inner land portion,
a groove width of the circumferential narrow groove is smaller than a groove width of the in-groove grooves,
an end of the circumferential narrow groove communicates with an inner circumferential groove extending in the tire circumferential direction, and
another end of the circumferential narrow groove is terminated at inside of the inner land portion.

2. The tire according to claim 1, wherein the groove portion is a narrow groove having a linear shape.

3. The tire according to claim 2, wherein
the groove portion has a hook-like shape including:
a hook groove section having a linear shape extending in the extending direction of the inclined portion; and
a linear groove section which communicates with the hook groove section, and which has a linear shape extending in the tire circumferential direction.

4. The tire according to claim 1, wherein the groove portion is formed by a plurality of pinhole sipes.

5. The tire according to claim 4, wherein
the plurality of in-groove grooves are arranged at predetermined intervals in the tire circumferential direction, and
the groove portion formed by the pinhole sipes is formed between each pair of the inclined portions adjacent to each other in the tire circumferential direction.

6. The tire according to claim 1, wherein
the groove portion includes:
   a first groove portion which is a narrow groove having a linear shape; and
   a second groove portion formed by a plurality of pinhole sipes, wherein
the second groove portion is formed close to the circumferential groove, and
the first groove portion is formed at a position which is more distant from the circumferential groove than a position of the second groove portion, and which is outside the second groove portion in a tread width direction.

7. The tire according to claim 6, wherein
the first groove portion has a hook-like shape including:
   a hook groove section having a linear shape extending in the extending direction in which the inclined portion extends; and
   a linear groove section which communicates with the hook groove section, and which has a linear shape extending in the tire circumferential direction.

8. The tire according to claim 6 or 7, wherein
the plurality of in-groove grooves are arranged at predetermined intervals in the tire circumferential direction, and
the second groove portion formed by the pinhole sipes is formed between each pair of the inclined portions adjacent to each other in the tire circumferential direction.

9. The tire according to claim 1, further comprising
an inner land portion located closer to a tire equator line than the land portion is, wherein
a plurality of sipes are formed in the inner land portion, and
the plurality of sipes do not communicate with the circumferential groove adjacent to the inner land portion, but are terminated an inside of the inner land portion.

10. The tire according to claim 1, comprising
lateral grooves each extending in a tread width direction, wherein
in a contact patch of the tire placed in a state where the tire is set at a standard inner pressure and a standard load is applied to the tire, a circumferential groove volume defined between the circumferential groove and a road surface is greater than a lateral groove volume defined between the lateral grooves and the road surface, and
in the contact patch of the tire, a total value of lengths of the in-groove grooves in the tread width direction is equal to or greater than a total value of lateral groove lengths of the lateral grooves in the tread width direction.

11. The tire according to claim 10, wherein an angle formed by the circumferential groove and a tire equator line is 45 degrees or smaller in a tread surface view.

12. The tire according to claim 10 or 11, wherein
an angle formed by each of the lateral grooves and a straight line perpendicular to a tire equator line is smaller than 45 degrees in a tread surface view.

13. The tire according to claim 1, wherein
each of the in-groove grooves includes:
   a high-angle groove section in which an angle formed by the in-groove groove and a straight line perpendicular to a tire equator line is greater than a predetermined angle; and
   a low-angle groove section which is continuous to the high-angle groove section and in which an angle formed by the in-groove groove and the straight line is smaller than the predetermined angle, and
at least two kinds of pitches are provided, where each of the pitches is a length in the tire circumferential direction from a position at which a tread surface of the tire has a predetermined shape to a position at which the predetermined shape appears again in the tire circumferential direction.

14. The tire according to claim 13, wherein
the high-angle groove section extends in the tire circumferential direction, and
the low-angle groove section extends in a tread width direction.

15. The tire according to claim 13 or 14, wherein
the low-angle groove section is provided on each of both ends of the high-angle groove section.

16. The tire according to claim 13 or 14, wherein
the low-angle groove section is continuous to the land portion.

* * * * *